United States Patent
Oren et al.

(10) Patent No.: US 11,803,863 B2
(45) Date of Patent: Oct. 31, 2023

(54) SYSTEM AND METHOD FOR FOOD SAFETY AUDIT AND SAMPLING

(71) Applicant: Crop Search LLC, Vermilion, OH (US)

(72) Inventors: Seth Oren, Edgerton, WI (US); Eric Engman, Cedarburg, WI (US)

(73) Assignee: Crop Search LLC, Vermilion, OH (US)

(*) Notice: Subject to any disclaimer, the term of this patent is extended or adjusted under 35 U.S.C. 154(b) by 0 days.

(21) Appl. No.: 18/051,067

(22) Filed: Oct. 31, 2022

(65) Prior Publication Data

US 2023/0186321 A1    Jun. 15, 2023

Related U.S. Application Data

(60) Provisional application No. 63/288,741, filed on Dec. 13, 2021.

(51) Int. Cl.
| | | |
|---|---|---|
| G06F 3/048 | (2013.01) | |
| G06Q 30/018 | (2023.01) | |
| G06F 3/0484 | (2022.01) | |
| G06Q 50/26 | (2012.01) | |
| H04W 4/029 | (2018.01) | |

(52) U.S. Cl.
CPC ......... *G06Q 30/018* (2013.01); *G06F 3/0484* (2013.01); *G06Q 50/265* (2013.01); *H04W 4/029* (2018.02)

(58) Field of Classification Search
CPC .. G06Q 30/018; G06Q 50/265; G06F 3/0484; H04W 4/029
See application file for complete search history.

(56) References Cited

U.S. PATENT DOCUMENTS

| | | |
|---|---|---|
| 6,299,934 B1 | 10/2001 | Manning |
| 7,194,965 B2 | 3/2007 | Hickey |
| 7,256,711 B2 | 8/2007 | Sheha |
| 7,411,518 B2 | 8/2008 | Ratnakar |
| 7,860,517 B1 | 12/2010 | Patoskie |
| 8,070,629 B2 | 12/2011 | Balardeta |
| 8,358,201 B1 | 1/2013 | Haddy |
| 8,442,763 B2 | 5/2013 | Tuck |
| 8,554,243 B2 | 10/2013 | Klassen |
| 8,682,575 B2 | 3/2014 | Sakashita |
| 8,694,240 B1 | 4/2014 | Lookingbill |
| 8,793,101 B2 | 7/2014 | Yuen |
| 9,131,642 B2 | 9/2015 | Groeneveld |

(Continued)

OTHER PUBLICATIONS

Jasson et al., "Alternative microbial methods: An overview and selection criteria" (Food Microbiology 27) p. 710-730.

(Continued)

*Primary Examiner* — David E Choi
(74) *Attorney, Agent, or Firm* — Robert P. Nupp

(57) ABSTRACT

Disclosed herein are embodiments of a system, method, and non-transitory computer-readable storage media for generating sampling plans for a selected agriculture area and providing a user interface configured to display sampling plan information to a user to allow for validation and traceability of sample collection in the agriculture area. One or more embodiments allow for sample plan information to be based in part on food safety audit information, some or all of which may have been collected using the system.

15 Claims, 22 Drawing Sheets

(56) References Cited

U.S. PATENT DOCUMENTS

| | | |
|---|---|---|
| 9,258,676 B2 | 2/2016 | Beckett |
| 9,756,844 B2 | 9/2017 | Groeneveld |
| 9,843,895 B2 | 12/2017 | Huang |
| 9,851,451 B2 | 12/2017 | Anghelescu |
| 10,007,391 B2 | 6/2018 | Sabtelli |
| 10,042,862 B2 | 8/2018 | Gorman |
| 10,096,073 B2 | 10/2018 | Groeneveld |
| 10,115,158 B2 | 10/2018 | Lindores |
| 10,117,617 B2 | 11/2018 | Cantu |
| 10,352,718 B2 | 7/2019 | Wu |
| 10,408,623 B2 | 9/2019 | Brush |
| 10,506,373 B2 | 12/2019 | Warren |
| 10,685,303 B2 | 6/2020 | Christie |
| 10,809,072 B1 | 10/2020 | Timmons |
| 10,842,144 B2 | 11/2020 | Groeneveld |
| 10,890,452 B2 | 1/2021 | Gum |
| 11,005,801 B1 | 5/2021 | Thom |
| 11,035,687 B2 | 6/2021 | Chang |
| 2002/0160817 A1* | 10/2002 | Salmimaa ............ G06F 3/04817 455/457 |
| 2006/0134726 A1* | 6/2006 | Samadpour ............... C12Q 1/04 435/32 |
| 2014/0188658 A1 | 7/2014 | Li |
| 2016/0132196 A1 | 5/2016 | Anghelescu |
| 2017/0042081 A1* | 2/2017 | Zumbach ................. G01N 1/08 |
| 2018/0188225 A1* | 7/2018 | Viscarra Rossel ....... G01N 1/08 |
| 2019/0043142 A1 | 2/2019 | Groeneveld |
| 2020/0104377 A1 | 4/2020 | Earnesty, Jr. |
| 2021/0103728 A1* | 4/2021 | Young .................... G06V 20/10 |
| 2021/0133196 A1* | 5/2021 | Gladwin ............... G06F 16/252 |
| 2021/0144987 A1 | 5/2021 | Groeneveld |
| 2021/0201025 A1* | 7/2021 | Ogawa .................... A01G 7/00 |
| 2022/0297148 A1* | 9/2022 | Wilcox .................. B05B 12/12 |

OTHER PUBLICATIONS

Jongenburger et al., "Statistical Aspects of Food Safety Sampling" (Annu. Rev. Food Sci. Technol. (2015) 6:479-503.

Jongenburger et al., "Random or systematic sampling to detect a localised microbial contamination within a batch of food" (Food Control 22 (2011)) 1448-1455.

Loyola et al., "Smart sampling and incremental function learning for very large high dimensional data" Neural Networks 78 (2016) 75-87.

Schaffner, "Microbial Criteria And Testing—Probability, Sampling And Sampling Plans" United Fresh.

Xu et al., "Evaluation of sampling methods for the detection of pathogenic bacteria on pre-harvest leafy greens" (Food Microbiology 77), p. 137-145.

* cited by examiner

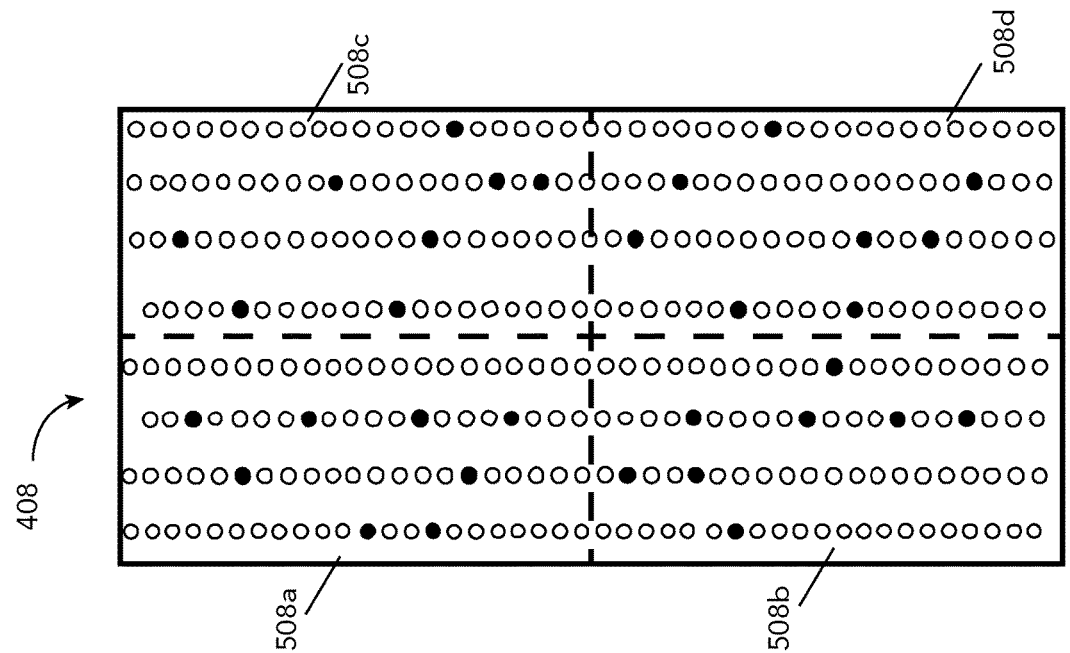
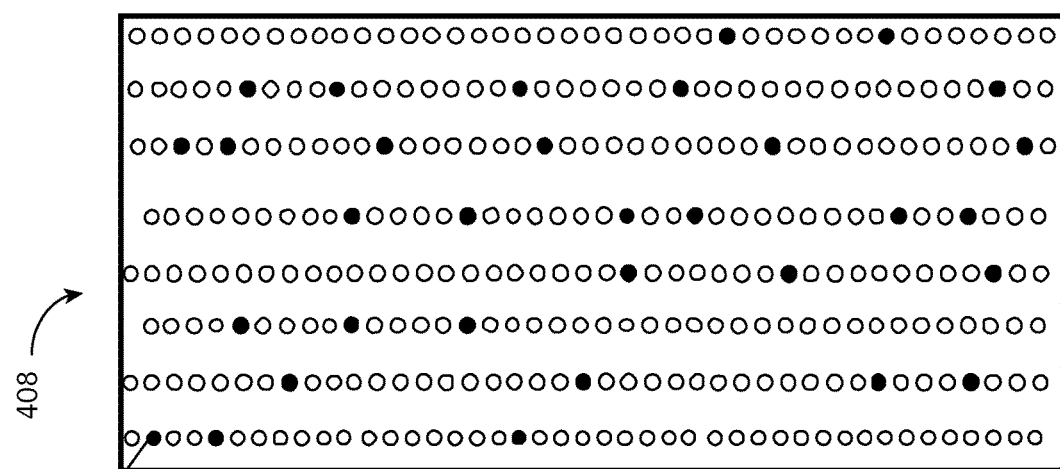
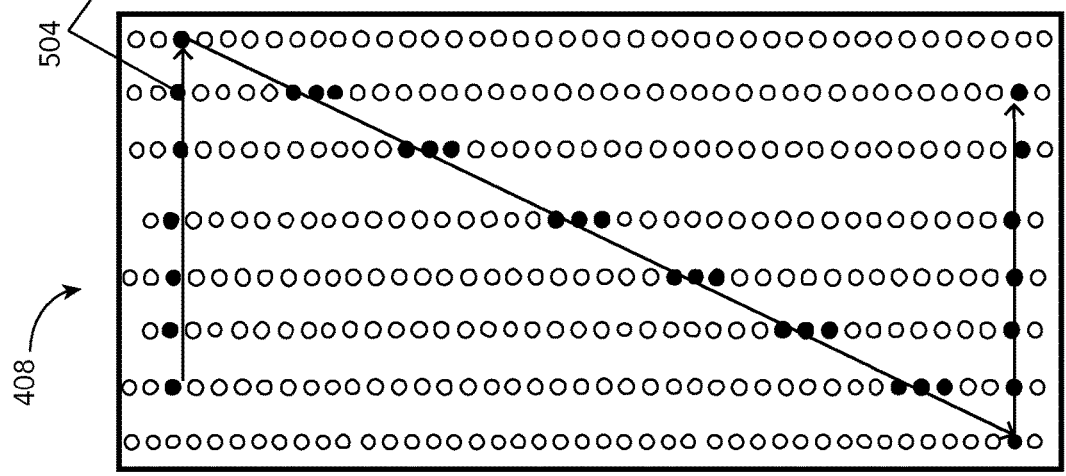
Fig. 5C
Fig. 5B
Fig. 5A

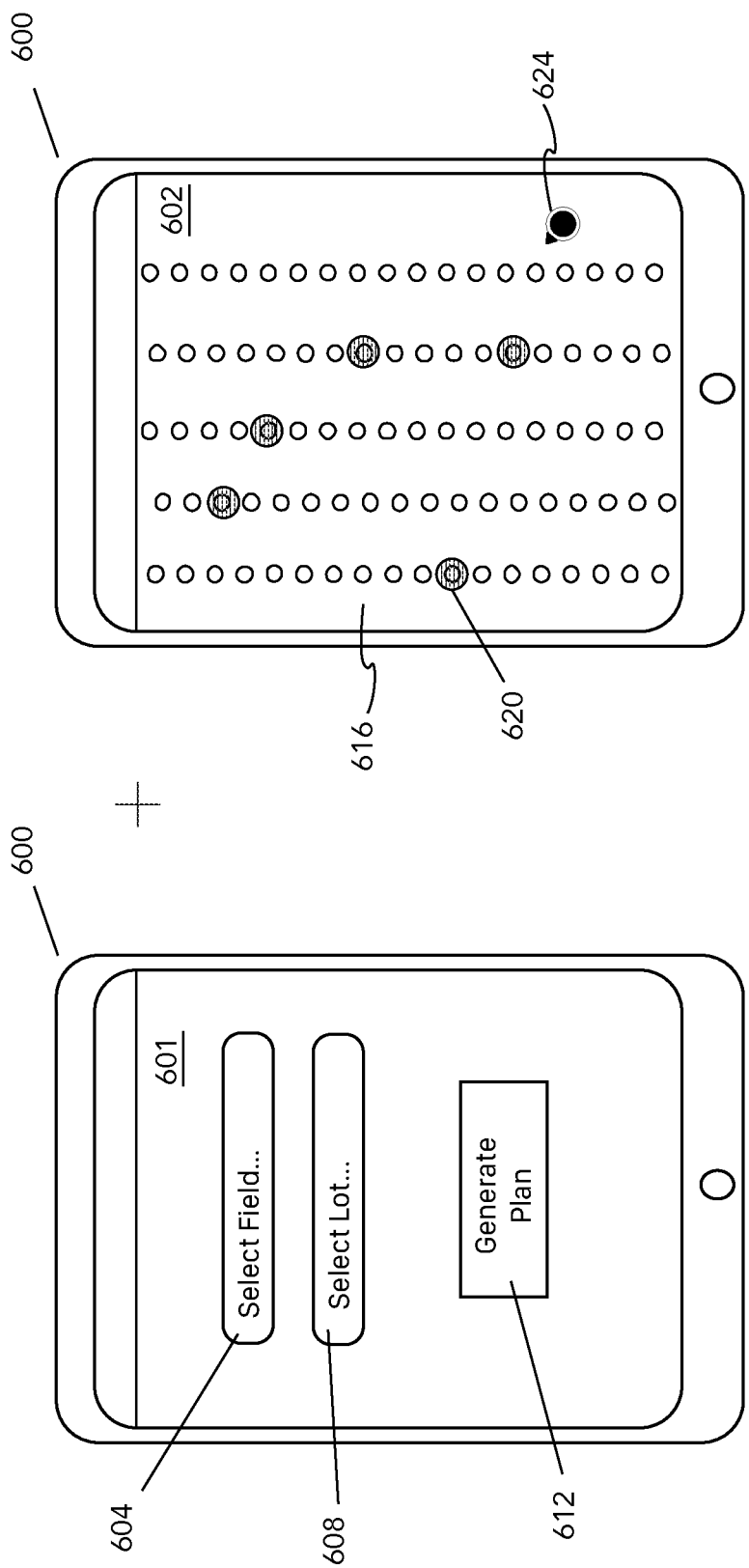

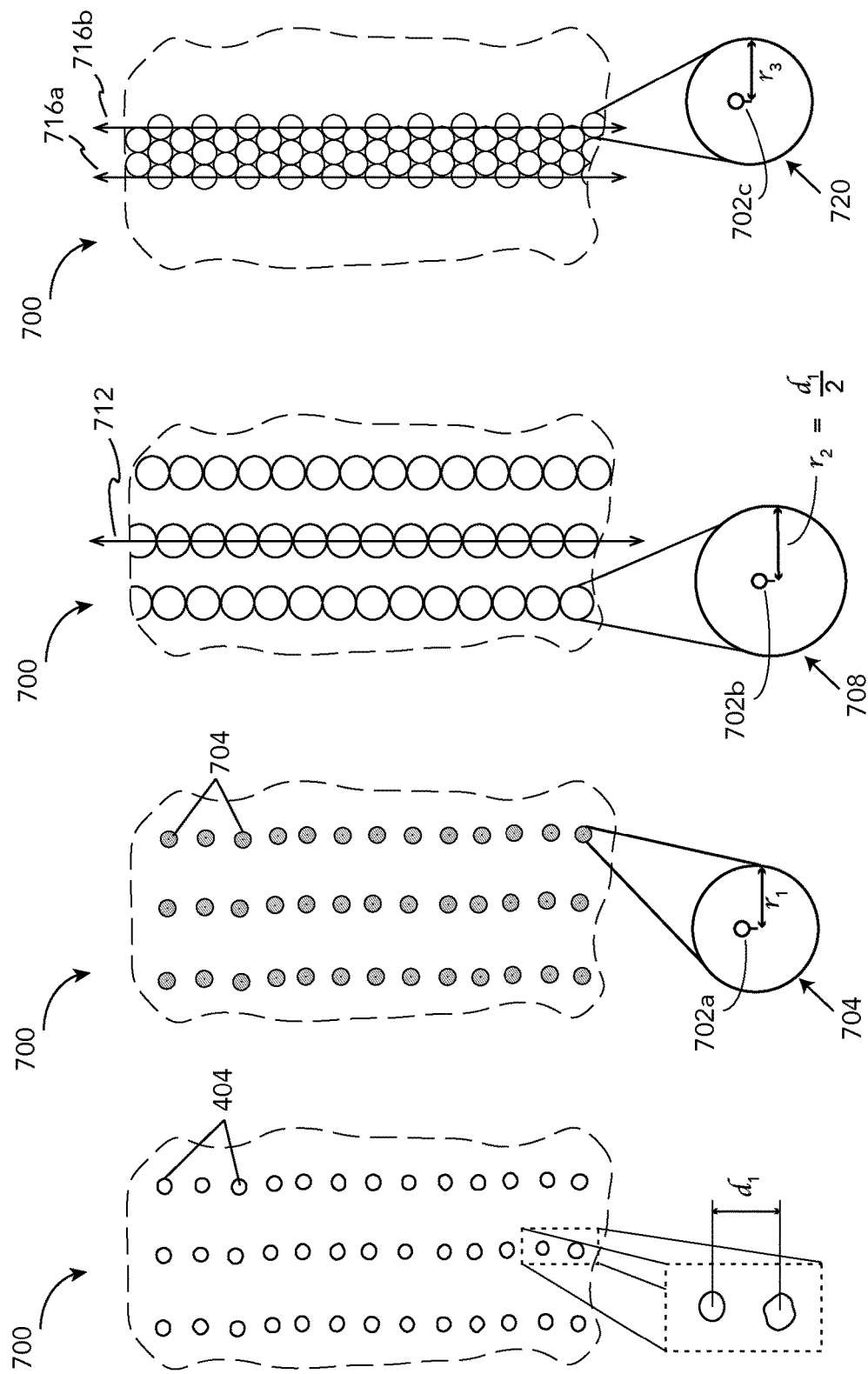

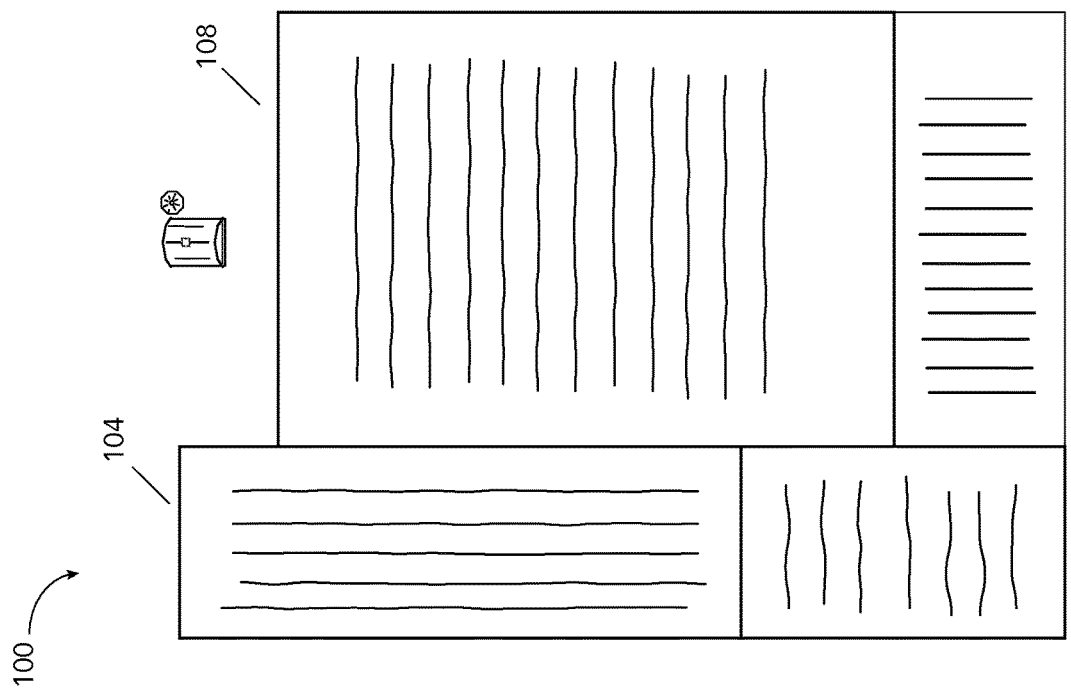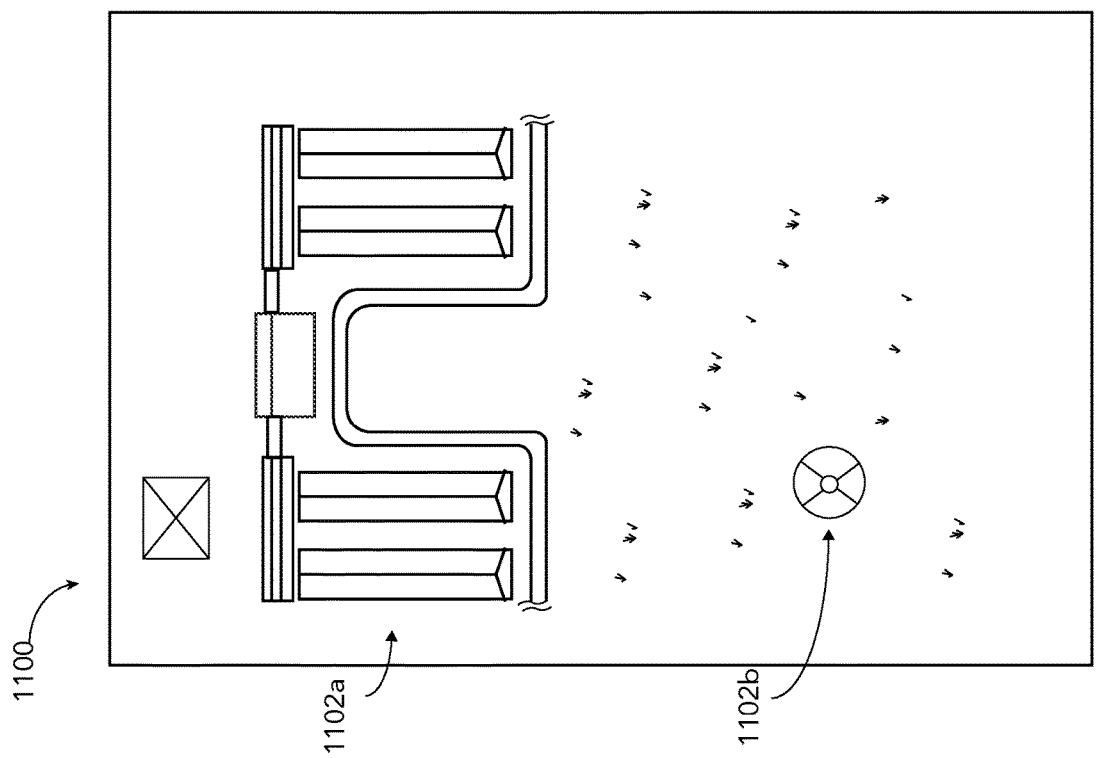
Fig. 11A

SYSTEM AND METHOD FOR FOOD SAFETY AUDIT AND SAMPLING

CROSS-REFERENCE TO RELATED APPLICATIONS

This application claims benefit of priority under 35 U.S.C. § 119(e) to U.S. Provisional Application No. 63/288,741, filed on Dec. 13, 2021, the entire contents and disclosures of which are incorporated herein by reference.

TECHNICAL FIELD

The present disclosure relates to an improved system and method to perform food safety audits and test sample planning and collection in an agriculture area having improved compliance and traceability aspects.

BACKGROUND

The testing for pathogenic microorganisms (e.g. bacteria and viruses) is an important function in a number of industries, including agriculture. If pathogenic microorganisms are not promptly detected and subsequently isolated and/or destroyed, they can cause monetary and social losses by damaging crops and/or causing sickness or death of animals and people.

Traceability of lab testing results (e.g., linking test results to the particular substrate(s) that were tested to obtain the results) is an increasingly important factor in testing for pathogenic microorganisms. For example, in agriculture, it is important to know from which lot of harvested crop and/or area of field harvested that a positive test result was obtained so that steps may be taken to either verify the positive test result or take steps to mitigate the potential for consumer consumption of any tainted product. A major component of traceability is a compliance mechanism to ensure that the product tested was actually sampled from the lot of harvested crop and/or area of the field that was specified. As operations grow larger, the ability to provide traceability of test results to particular samples in a timely manner becomes increasingly difficult and time-consuming.

Optimizing population sampling (e.g., lot sampling) is also an increasingly important factor in testing for pathogenic microorganisms. As the number of samples obtained per lot increases, the cost may become prohibitive with only marginal improvement in population information obtained (e.g., likelihood of detecting a present pathogen in a population). Collection and use of food safety audit information for the sampled field is likely to help improve probability of detection of pathogens without increasing the number of samples collected.

Based on the foregoing, there is a need for an improved system and method to collect pathogen test samples that provides improved traceability and more optimized sampling routines. The present disclosure is directed to such a system and method.

BRIEF DESCRIPTION OF THE DRAWINGS

The features, aspects, and advantages of the present invention will become better understood with regard to the following description, appended claims, and accompanying drawings where:

FIG. 5A shows a schematic drawing of the exemplary agriculture area of FIG. 4 with additional features illustrating an exemplary sample collection set;

FIG. 5B shows a schematic drawing of the exemplary agriculture area of FIG. 4 with additional features illustrating an exemplary sample collection set;

FIG. 5C shows a schematic drawing of the exemplary agriculture area of FIG. 4 with additional features illustrating an exemplary sample collection set;

FIG. 6A illustrates an exemplary user interface that may be used in accordance with embodiments of the present disclosure;

FIG. 6B illustrates an exemplary user interface that may be used in accordance with embodiments of the present disclosure;

FIG. 7A shows a line drawing illustrating a portion of the exemplary agriculture area of FIG. 4 and an exemplary method for generating potential sample collection locations/sample collection grid elements for the agriculture area in accordance with embodiments of the present disclosure;

FIG. 7B shows a line drawing illustrating a portion of the exemplary agriculture area of FIG. 4 and an exemplary method for generating potential sample collection locations/sample collection grid elements for the agriculture area in accordance with embodiments of the present disclosure;

FIG. 7C shows a line drawing illustrating a portion of the exemplary agriculture area of FIG. 4 and an exemplary method for generating potential sample collection locations/sample collection grid elements for the agriculture area in accordance with embodiments of the present disclosure;

FIG. 7D shows a line drawing illustrating a portion of the exemplary agriculture area of FIG. 4 and an exemplary method for generating potential sample collection locations/sample collection grid elements for the agriculture area in accordance with embodiments of the present disclosure;

FIG. 11A shows a line drawing illustrating another view of the exemplary agriculture area of FIG. 1 in proximity with an exemplary dairy area, useful for certain embodiments in accordance with the present disclosure;

DETAILED DESCRIPTION OF ILLUSTRATIVE EMBODIMENTS

Figure 1:
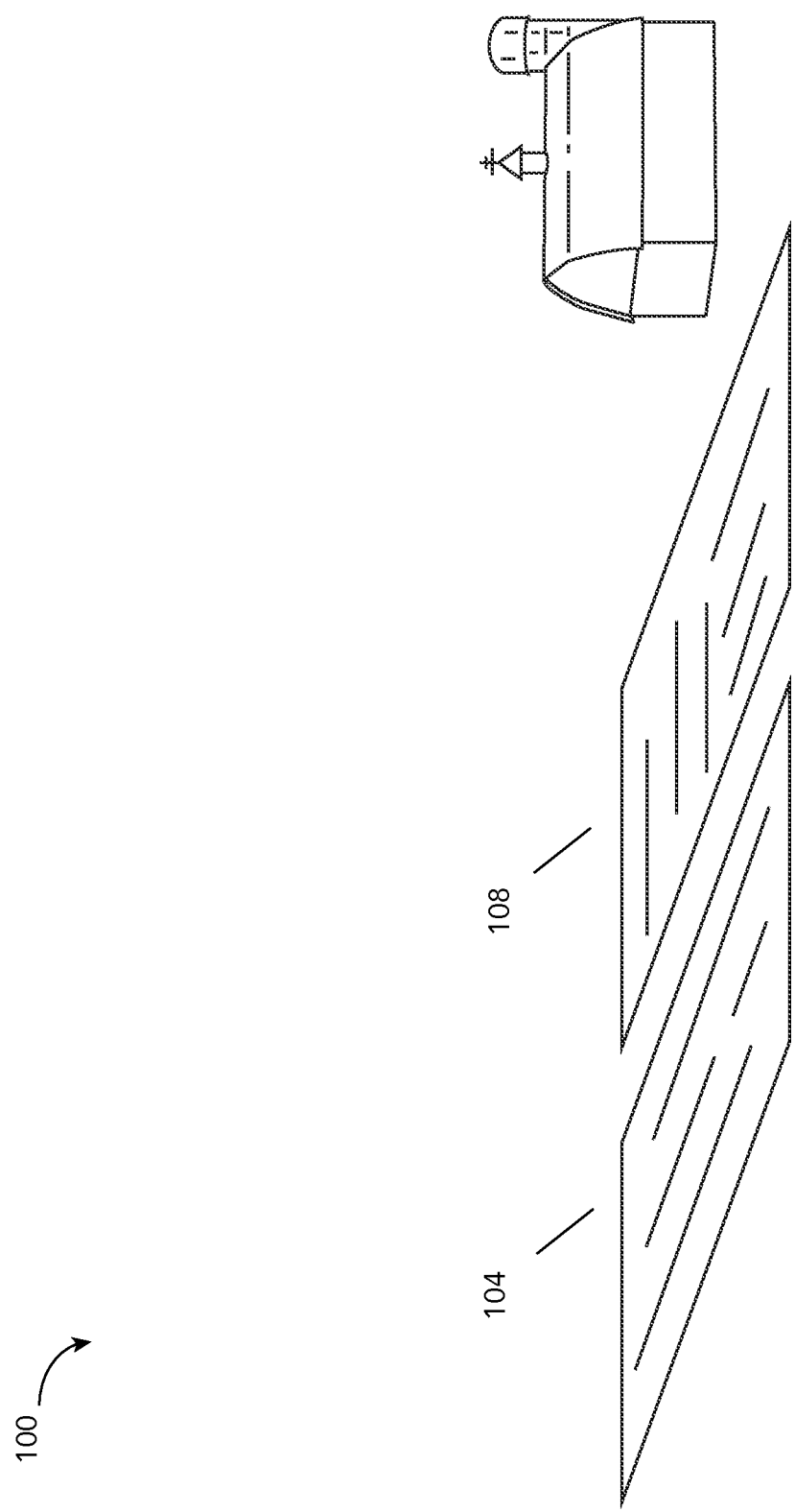
FIG. 1 shows a line drawing representing an exemplary agriculture area useful for certain embodiments in accordance with the present disclosure.

The present disclosure describes and illustrates one or more novel embodiments of a system and method to perform food safety audits and test sample planning and collection in an agriculture area having improved traceability.

Generally, the terms "agriculture area", "agriculture environment", "growing area" and "growing environment" may be used interchangeably herein to refer to any one or all of: a farm, field, section, lot, subsection, sublot and block, as context dictates.

As used herein, the term "farm" may be understood to refer to one or more fields.

As used herein, the term "field" may be understood to mean a physical area for growing crops.

As used herein, the term "section" may be understood to refer to a physical area that is a portion or part of a field.

As used herein, the term "lot" may be understood to refer to a quantity of a crop, grown and harvested under the same or similar growing conditions, that an operation may treat as an identifiable quantity of crop in its operations. In many contexts, the term "lot" may be understood to refer to the physical area that the lot was grown and harvested in, and unless contexts suggests otherwise, the terms "lot" and "section" may be used interchangeably herein.

As used herein, the terms "subsection" and "block" may be used interchangeably and understood to refer to a physical area that is a portion or part of a section.

As used herein, the term "sublot" may be understood to refer to either a quantity of a crop grown in the same subsection under the same or similar growing conditions or the subsection itself, depending on the context. As used herein, the term "sublot" may be used interchangeably with the term "subsection" to refer to a physical area that is a portion or part of a section, unless context suggests otherwise.

As used herein, the terms "pathogen" and "pathogenic microorganism" shall include without limitation any fungal, bacterial, parasitic or viral pathogen that causes any abnormal state, condition, or characteristic of a plant or animal. A pathogenic microorganism may be associated with a biological source by causing a disease in the source, i.e., it is a pathogen of the source. In this type of association, the source may be characterized as being infected with the pathogenic microorganism. Examples of source infectants include *Xanthomonas campestris* pv. campestris (Xcc), which causes black rot in brassica plants, such as cabbage and broccoli, and *Xanthomonas* campes-tris pv. vitians, which causes bacterial leafspot of lettuce.

Instead of infecting a source, a pathogenic microorganism may be associated with a biological source simply by being present on the source, without causing disease in the source, i.e., it is not a pathogen of the biological source, but is a pathogen for another plant or animal, such as a human. In this type of association, the source may be characterized as being contaminated with the pathogenic microorganism. Examples of source contaminants are microorganisms that are human pathogens (but not plant pathogens), which may be present on plants (e.g. vegetables) that are harvested for human consumption. Such microorganisms may include, for example, but not limited to, enterovirulent *Escherichia coli* (*E. coli*), *Listeria monocytogenes, Salmonella* spp., and *Cyclospora* cayatanensis. Enterovirulent *E. coli, Listeria monocytogenes*, and *Salmonella* spp. are all bacteria that can cause serious illness in humans, while *Cyclospora* cayatanensis is a parasitic microorganism that may cause serious illness in humans. Indeed, these pathogenic microorganisms may cause 1 million human illnesses per year in the United States, with contaminated vegetables being a major source of these illnesses.

Food Safety Programs

To help ensure food safety against a risk of the latter type of pathogens, many food producers implement food safety management control plans and controls (programs), and some programs may include what is known as a hazard analysis (of) critical control points (HACCP). Many such programs include sampling and testing of the food at various stages of the food production process to check for pathogenic contamination. For example, many food growers collect crop samples in the field just prior to harvest for testing, especially growers of raw foods or ready-to-eat foods (such as raw or minimally processed fruits and vegetables).

Some food safety management control programs may also include regular food safety audits of the growing environments. Such audits may include a person or group of people visually checking the growing environment (e.g. fields) one or more times during a growing season for signs of potential food safety risks and recording information indicative of such risks. Additionally, some growers may incorporate various sensor data and models in their food safety management control programs.

Some examples of potential food safety audit risks for growers in fields include, but are not limited to, evidence of animal intrusion (e.g., feces, tracks), evidence of poor labor practices (e.g., wash stations present/absent during harvest), proximity to cattle or other grazing animals (e.g., dairies), proximity to overhead wires or other points that invite birds to congregate, etc. Some audits collect data from sources other than human visual checks, such as (but not limited to) drainage or irrigation water pathogen testing information, high wind or rain event information, humidity sensor data, temperature sensor data etc. Unless context suggests otherwise, the terms "food safety audit information", "food safety data", and "food safety information" are used interchangeably herein and may be understood to include, but are not limited to, any of the types of the foregoing information.

Pathogen Detection Testing.

In general, any foodborne pathogen detection technology suitable for providing the functionality described herein may be utilized with the system and method of the present disclosure. For example, generally any well-characterized culturing methods using selective media that are validated for the particular matrix (e.g., sampled crop) being tested may be utilized. Additionally, newer technologies validated or capable of being validated against well-characterized culturing methods, such as DNA-based detection methods, may be utilized.

It should be noted that in the detailed descriptions that follow, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Referring now to FIG. 1, there is shown an exemplary agriculture area 100 in which one or more exemplary embodiments of the method and system of the present disclosure may be utilized. In this example, agriculture area 100 is a farm having a plurality of fields (fields 104, 108) in which one or more crops may be grown and harvested. Each field may be sectioned into one or more sections. Generally, any crop capable of being infected by or supporting any pathogenic microorganism may be grown in fields of agriculture area 100. Some non-limiting examples of such crops include lettuce, spinach, kale, broccoli, cabbage, cauliflower, melons, beans, etc. In general, each section/lot of a field contains the same type of crop that is grown under similar conditions, while different sections/lots may contain the same or different crops and/or the same or different growing conditions from those of other sections/lots. Also generally, each section may be any suitable size, depending on a variety of factors including but not limited to: the crop, business needs, food-safety protocols, etc. Some non-limiting embodiments may utilize sections/lots that are between 0.1 to 10 acres; others between 0.25 to 5 acres; others between 0.5 to 2 acres; others between 0.75 to 1.5 acres.

Figure 2:
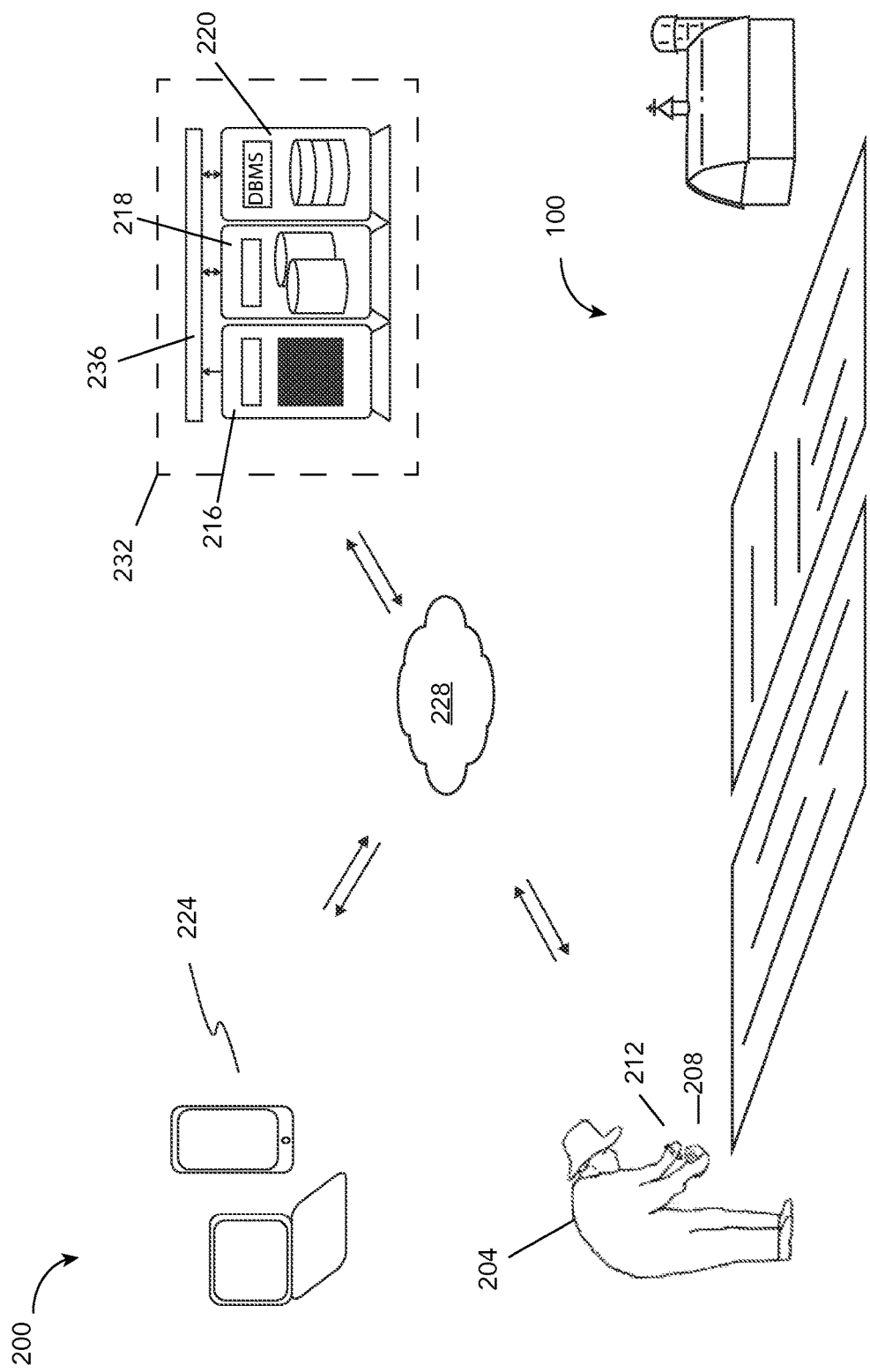
FIG. 2 shows a schematic drawing of portions of a system useful for an agriculture area in accordance with the present disclosure.

FIG. 2 illustrates portions of an exemplary system 200 for performing food safety audits and test sample planning and collection in an agriculture area (e.g., area 100) having improved compliance and traceability aspects, according to one or more embodiments of the present disclosure. As shown, one or more sampling users 204 may take one or more test samples of a crop (e.g., crop 208) using generally any suitable manner of sample extraction. A non-limiting example of sample extraction may include utilizing a mechanical coring or extraction tool (e.g., tool 212) that obtains a small physical specimen by, e.g., scraping, puncturing, tearing, etc. Another suitable example may include hand-tearing of leaves or outer surfaces on a crop (e.g., head lettuce, cabbage). Individual samples may be placed in individual collection units (e.g., wells of a tray) or convoluted by placing multiple samples from a defined geographic area (e.g., section) in a collection unit (e.g., sterile plastic bag). Collection units may be tagged, barcoded, QR coded or otherwise marked for identification and tracking purposes. In some embodiments in which field samples are not convoluted in the field (i.e., individual samples are collected and stored separately, as in a multi-well tray), the tag, barcode, GQ code or other identifier may be linked to the precise geolocation that the sample was collected.

With continuing reference to FIG. 2, system 200 may include one or more application servers 216 and one or more application databases 220. In some embodiments, system 200 may also include one or more application storages 218. In addition, system 200 may include one or more mobile computing devices 224. In one or more embodiments, mobile device(s) 224, application server(s) 216, storage 218, and/or database(s) 220 may be in data communication via one or more network(s) 228. Network(s) 228 may be the internet, intranets, extranets, local area networks (LANs), wide area networks (WANs), wired networks, wireless network (using wireless protocols and technologies such as, e.g., Wifi or cellular), or any other network suitable for providing data communications between two machines, environments, devices, networks, etc. In one or more embodiments, application server 216, storage 218 and/or database 220 may be implemented on networked dedicated host machines; in other embodiments, they may be hosted as services in one or more service provider environments 232. In general, a service provider environment, such as service provider environment 232, may comprise cloud infrastructure, platform, and/or software providing various servers, databases, data stores, and the like.

Application server 216, storage 218, and database 220 may host one or more agronomic applications 236. In general, agronomic application 236 may comprise one or more software applications that are generally configured to provide backend functionality, server to client functionality, and/or web application functionality, to one or more software applications or components running on, e.g. mobile devices 224. The one or more software applications or components running on mobile devices 224 may generally be configured to tightly integrate with application 236 (as in the case of front/backend architecture) or loosely integrate or couple with application 236 (as in the case of client/server or web application architecture).

Agronomic application 236 may comprise one or more applications deployed on service environment 232 that performs one or more agronomic related services. For example, agronomic application may comprise field management, information management, and/or food safety components. Agronomic application 236 may provide certain basic front and backend functionality for users (such as agronomist, specialist, or farmer users using one or more mobile devices 224) to, e.g., search, store, and analyze agronomic related information. Agronomic application 236 may provide functionality such as, e.g., storing and retrieving agronomic content (e.g., farm, field and section identifiers and geolocation information, sensor and harvest data, crop data, prescription data, etc), generating content pages, interfacing to other backend systems (e.g., financial and accounting systems, etc.) and other components or sub-systems (e.g., search), workflow, event messaging, commercial documentation, etc. Agronomic application 236 may be supported by one or more application databases 220. Database 220 may be any database sufficient to support the functionality of system 200, such as for example one or more relational databases and/or a document-oriented databases. In an exemplary embodiment, system 200 utilizes one or more Firebase® Realtime, MySQL®, and/or a MongoDB® databases.

Storage 218 may be any suitable storage for efficiently allowing file intake, storage, and access; for example, storage 218 may be simple web-based object storage comprising one or more logical units of storage (e.g., buckets), such as an application data store and/or image or other file upload data store. In an exemplary embodiment, storage 218 is Amazon® S3 object storage, Google® cloud storage, and/or IBM® cloud object storage.

In one or more embodiments, certain functionality of system 200 may be performed by code executing on mobile device 224. For example, device 224 may have one or more components or applications (e.g., Swift® apps for iPhone) that, when executed on device 224, provide all or a portion of the sampling, audit, and/or tracking screen(s) and service(s) to a user described in more detail in below. In some embodiments, such mobile device component(s) may be configured to interact remotely with application 236 via network 228; in some embodiments, such interaction may be via one or more APIs or custom or protocol networked requests. In some embodiments, such mobile device component(s) may be configured to generate one or more files (e.g., .txt or .csv files) that contain, e.g., image analysis information, food safety audit information, geolocation information, and/or metadata information, and may be configured to upload such files and/or information to application 236 for search and archival purposes, among others.

Figure 3A:
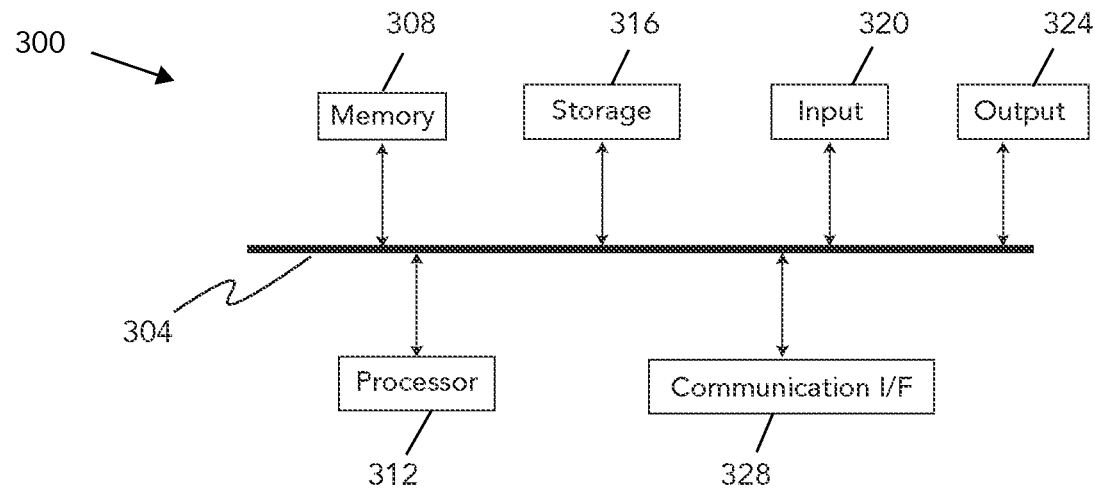
FIG. 3A shows a block diagram illustrating an exemplary computing device in which various embodiments or portions of embodiments of the present disclosure may be implemented.

As already described, embodiments of the method and system described herein may be performed on or by one or more computing devices, alone or in combination with one or more other computing devices and/or systems. Generally, computing devices (such as, e.g., computing devices described in relation to system 200) may be any suitable machines sufficient to run one or more aspects of the system described herein and provide the functionality described herein. FIG. 3A is a block diagram showing a high-level logical arrangement of certain components for an exemplary computing device 300 which may be employed to practice embodiments or portions of embodiments of the present disclosure. Bus 304 ties system components including memory 308 (e.g., ROM and/or RAM) to processor 312. Bus 304 may generally be any suitable type of bus structure using any suitable bus architecture, such as for example, a memory bus or controller, a peripheral bus, or a local bus. In some embodiments, bus 304 may include specialized architectures such as shared memory for integrated GPU(s) or on-chip interconnects. Information transfer to/from the bus (and components) may be accomplished by any suitable means, such as for example a BIOS stored in ROM 308 or the like. Memory 308 may also include specialized memories such as local caches and registers. Device 300 may have more than one processor 312 or may comprise a group or cluster of computing devices 300 networked together to provide greater processing capacity. Processor 312 may include any general purpose processor, as well as any special-purpose processor. Device 300 may include storage 316 (e.g., flash memory, hard disk drive, magnetic or optical disk drive, or the like). Storage 316 may include software, data and/or instructions for performing functions such as controlling processor 312. In general, the non-transitory computer readable storage media (memory or storage) provide nonvolatile storage of computer readable instructions, data structures, program modules and data for processing device 300. A person of ordinary skill in the art would know how to make variations to the basic components described to suit a particular function or need. Non-transitory computer-readable storage media expressly exclude media such as energy, carrier signals, electromagnetic waves, and signals per se.

With continuing reference to FIG. 3A, computing device 300 may comprise input devices 320 and output devices 324. In general, input devices 320 may be any number of input means, such as a digital camera or camera sub-system (e.g., e.g., CCD or CMOS-based camera sub-system), microphone for speech, a touch-sensitive screen for gesture or graphical input, a keyboard, mouse, and the like. Also in general, output devices 324 may include any number of output means, such as for example a visual monitor (touchscreen, LCD, CRT, etc.), a printer, and the like. Communications interface(s) 328 generally governs and manages the user input and system output. A person of ordinary skill in the art would know how to make variations to the basic components described to suit a particular function or need, and that the basic features described here may be substituted with improved software, hardware or firmware arrangements as they are developed.

The exemplary device of FIG. 3A is illustrated as including individual functional blocks. In general, the functions represented by these blocks may be provided through the use of either shared or dedicated hardware, including but not limited to, hardware capable of executing software and hardware that is purpose-built to operate as an equivalent to software executing on a general purpose processor. Some embodiments may include CPU, GPU, microprocessor and/or digital signal processor (DSP) hardware, read-only memory (ROM) for storing software performing the operations described herein, and random access memory (RAM) for storing results. Logical operations of various embodiments described herein may be implemented as, for example, a sequence of computer implemented steps, operations, or procedures running on a processor or processing resource within one or more general or specific-use computers. Device 300 may practice all or part of the recited methods, may be a part of the recited systems, and/or may operate according to instructions in the recited non-transitory computer-readable storage media. Such logical operations may be implemented as modules or components configured to control processor 312 to perform particular functions according to the programming of the module/component.

Figure 3B:
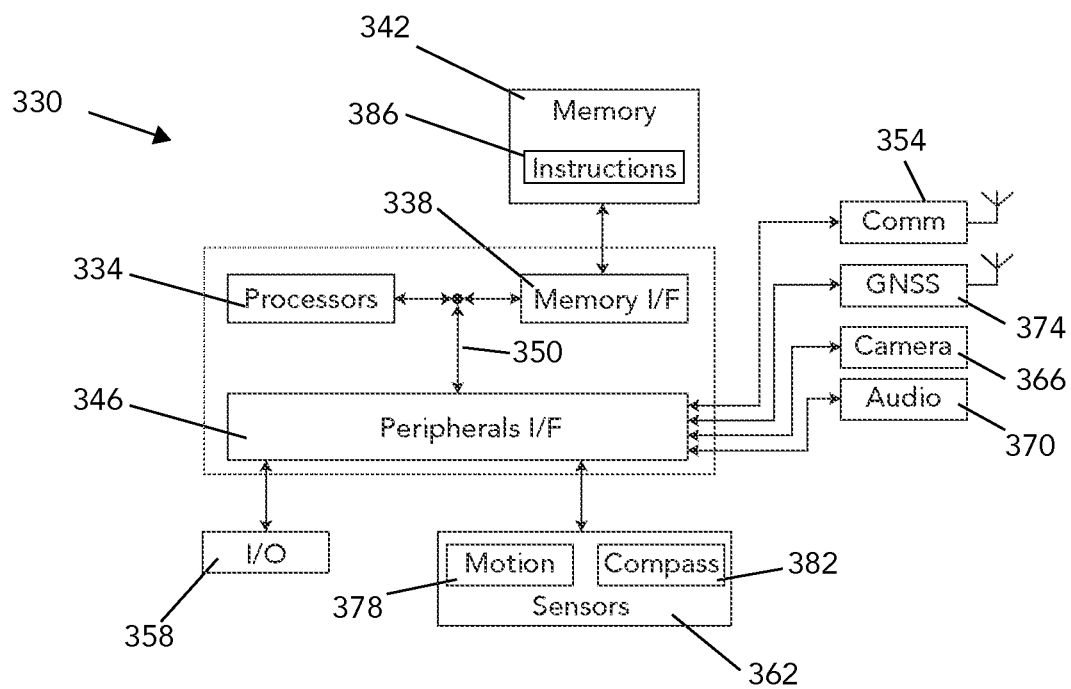
FIG. 3B shows a block diagram illustrating an exemplary mobile device in which various embodiments or portions of embodiments of the present disclosure may be implemented.

FIG. 3B is a block diagram showing a more granular logical arrangement of certain components demonstrating an architecture for an exemplary computing device 330 which may be employed to practice some embodiments or portions of some embodiments of the present disclosure. FIG. 3B and computing device 330 may be considered to be a more granular description of a subset of computing device 300 shown in FIG. 3A (e.g., mobile devices), and the descriptions relating to both should be construed congruently.

Generally, device 330 may be any computing device sufficient to implement the features, functions and processes described herein in relation to FIGS. 2-19, including handheld computers, mobile phones (e.g., iPhone®), laptop computers, tablet devices (e.g., iPad®), media players, personal digital assistants (PDA), wearable computers (e.g., Apple Watch®), or the like.

Computing device 330 may comprise one or more processors 334, a memory subsystem (e.g., interface/controller 338 and memory 342), and a peripheral subsystem (e.g., interface 346 and interfaced peripherals). The various components may be operatively associated in any suitable manner; for example, on one integrated circuit board (ICB) or multiple ICBs, via one or more hard or soft interfaces, etc. One or more buses or signal lines (e.g., bus 350) may couple the various components. A person of ordinary skill will appreciate that the architecture shown in FIG. 3B is but one exemplary architecture for computing device 330, and that computing device 330 may have more or fewer components than shown, or a different configuration of components. Components may be implemented in hardware, software, firmware, or a combination of hardware, software and firmware.

Communication subsystem 354 may comprise one or more wireless communication subsystems implementing one or more wireless communication protocols (e.g., networking protocols). Generally, wireless communication subsystem 354 may comprise one or more radio and/or infrared transmitters and receivers (or transceivers). Additionally or alternatively, communication subsystem 354 may comprise one or more ports (e.g., USB) for connectivity to one or more computing devices, which may themselves be wired or wireless communication devices.

Generally any communication protocol and the components needed to implement the protocol via communication subsystem 354 sufficient to perform the functions described herein may be utilized in the embodiments of this disclosure. Some exemplary and non-limiting implementations include those that are configured to operate over cellular (e.g., GSM, GPRS, CDMA, EDGE) networks, IEEE802.xx communication networks (e.g., Wi-Fi, Wi-Max, ZigBee®), and/or Bluetooth® networks. In some embodiments, communication subsystem 354 may be configured to permit computing device 330 to synchronize with a host device using one or more protocols, such as, for example, TCP/IP, HTTP, UDP, ICMP, FTP, SOAP, and any other similar, suitable protocol or technology. For example, in one or more embodiments, computing device 330 may link via subsystem 354 to an external GNSS receiver, such as e.g., the Emlid® Reach or Eos Arrow Series® (RTK) receivers, using any suitable data and communication protocol(s) such as TCP, LoRA, Bluetooth, and NTRIP.

Referring still to FIG. 3B, computing device 330 may include peripherals such as input/output subsystem 358 (that may itself include inputs/outputs such as a touchscreen subsystem, keyboard, mouse, etc. (not shown)), sensor subsystem 362, camera subsystem 366, and audio subsystem 370.

In one or more embodiments, computing device 330 may also comprise Global Navigation Satellite System (GNSS) subsystem 374. GNSS subsystem 374 comprises a GNSS receiver configured to receive GNSS (e.g., GPS) satellite signals and determine and output/make available the current geolocation information (e.g., location coordinates & time) of the receiver/device on a predetermined schedule. In some embodiments, GNSS subsystem 374 may also be configured to receive position correction data (e.g., RTK data) from an external GNSS receiver (not shown), such as e.g., an Emlid® Reach receiver or Eos Arrow Series® receiver, and use the position correction data to improve the accuracy of the GNSS receiver geolocation information and/or to adopt the geolocation information generated by the external GNSS receiver. In some embodiments, GNSS subsystem 374 updates its current geolocation information with a frequency between 0.1 Hz to 20 Hz.

Peripherals interface 346 may comprise a monolithic interface or multiple, specialized interfaces that themselves may comprise one or more components (hardware, software, firmware, or combinations thereof) that provide interfacing of peripheral subsystems with processors 334.

In some embodiments, sensor subsystem 362 may include sensors such as motion sensor 378 and compass 382. In some embodiments, motion sensor 378 and compass 382 may be used to determine movement and orientation of the device 330.

In general, memory 342 may be any suitable non-transitory machine-readable medium that can store instructions and data for use by processors 334. For example, memory 342 may comprise a high-speed random access and/or non-volatile memory including instructions configured to cause a computing device such as device 330 to perform operations and/or store data. In addition, memory 342 may comprise machine-readable storage including instructions configured to cause a computing device such as device 330 to perform operations and/or to store data. Memory 342 may comprise a memory hierarchy, including cache, main memory and secondary memory. The memory hierarchy may be implemented using any combination of RAM, ROM, FLASH, magnetic and/or optical storage devices, and the like.

In general, memory 342 may store any instructions 386 for implementing the features and processes of the embodiments disclosed herein, as described in reference to FIGS. 2-19. Some non-limiting examples may include operating system instructions (e.g., iOS, Android, etc.), instructions that facilitate communicating with other devices, computers or servers, camera instructions that facilitate camera-related processes and functions, GUI instructions that facilitate GUI-related processes and functions, GNSS/navigation instructions to facilitate GNSS and navigation-related processes and functions, sensor instructions that facilitate sensor-related processes and functions, and media instructions to facilitate media-related processes and functions.

Processors 334 may be implemented in generally any suitable manner capable of executing the instructions to perform the operations and functions described in relation to the embodiments herein. Non-limiting examples may include one or more CPUs, GPUs, microprocessors, multi-core processors, coprocessors, CPLDs, ASIPs, microcontrollers, ICs, ASICs, FPGAs, PLAs, and/or accelerators. A person or ordinary skill will understand that processors 334 may be configured for a particular use or configured to execute instructions stored in volatile or non-volatile memory or otherwise accessible to processors 334 in order to perform the steps or operations according to embodiments of the present disclosure.

Figure 4:
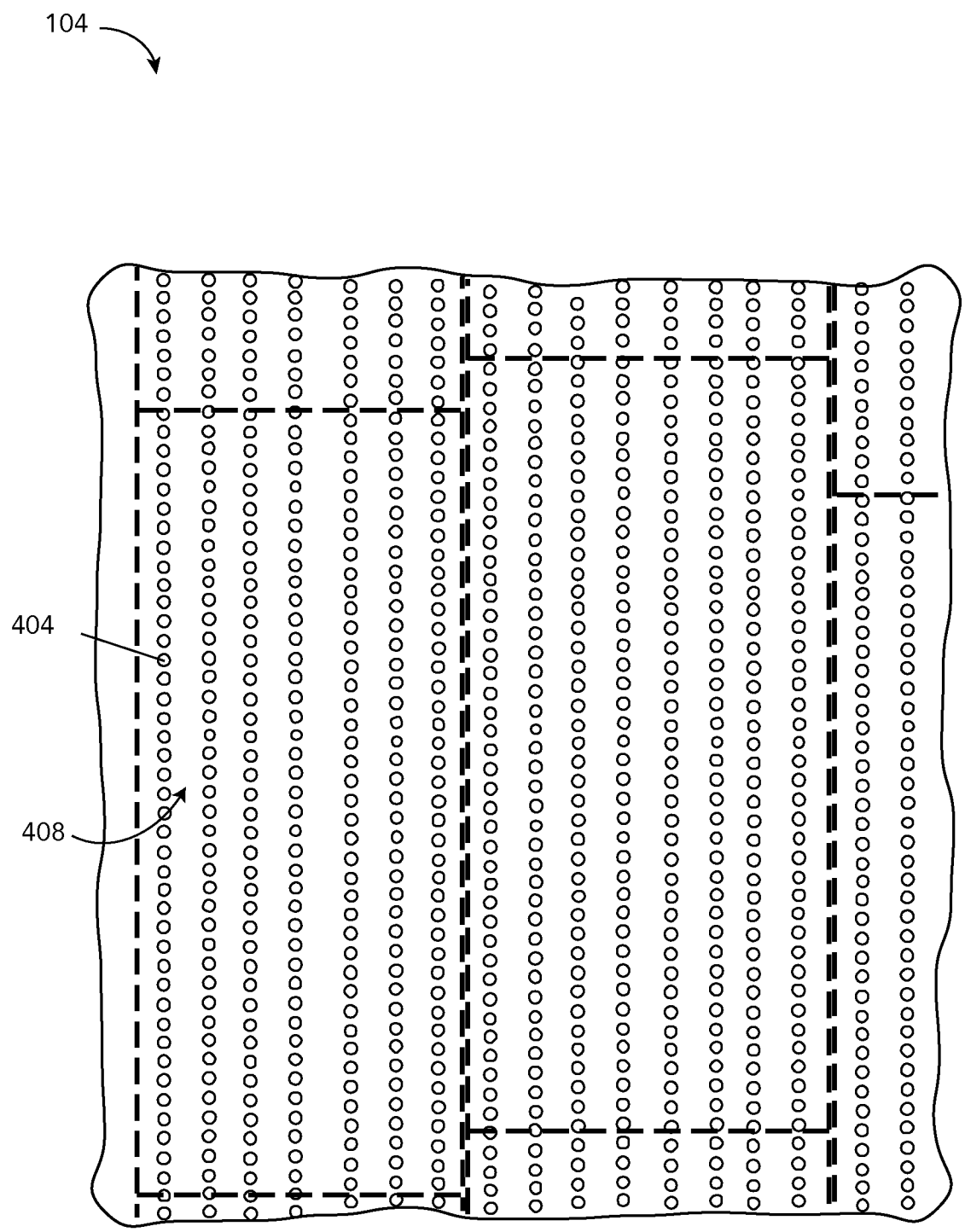
FIG. 4 shows a line drawing illustrating an exemplary agriculture area useful for certain embodiments in accordance with the present disclosure.

Referring now to FIG. 4, shown is a top/plan view of a portion of exemplary field 104. In this non-limiting embodiment, crop 404 (e.g., lettuce, cabbage) is planted in beds/rows having approximately regular spacing between rows and between individual plants. In this view, field 104 has been partitioned into sections, with section 408 being representative. It should be noted that the embodiments herein are not limited to system and methods that may operate in the particular section or crop arrangement shown in the FIGS. herein, but may operate in fields and sections of generally any arrangement, shape, or size, having generally any crops and generally any planting style (e.g., tightly packed beds, broadcast seeded, etc). Also, it should be understood that references to field, section and strata "partitions," as used herein, do not necessarily require physical partition, but rather may refer to georeferenced/geofenced areas whose boundary data may be stored and referenced in or by one or more computing devices (e.g., devices 224). In some preferred embodiments, such boundary data may be stored in database 220.

Sampling Plans

In general, a sampling plan for an agriculture area (e.g., a pre-harvest sampling plan) may comprise at least: (1) NT, the number of samples to be collected from a sampling area (e.g., a lot or section), and (2) a collection pattern specification—the type of pattern and/or the individual geographic locations to be utilized in making the sample collections within the sampling area. Both of these parameters may be influenced or controlled by one or more of regulations, industry standards, generally accepted good practices, the type or class of pathogen targeted, and/or testing constraints (e.g., cost, time), among other considerations. In general, the embodiments herein may be implemented using sampling plans having generally any number of samples/sample locations and generally any collection pattern specification.

Referring now to FIGS. 5A-C, shown is a top/plan view of an individual field section (e.g., section 408 of field 104), depicting three exemplary, non-limiting collection patterns of a typical sampling plan. In each FIG., individual sample locations specified in the plan are depicted as filled circles (e.g., locations 504). In these examples, and in every example hereinafter unless context suggests otherwise, NT=32. Note, however, any suitable number of samples to be collected/sample locations may be utilized in practice, and the embodiments are not dependent on a particular NT. FIG. 5A depicts a "Z-pattern" collection pattern. As the name indicates, a Z-pattern generally requires that a person collect samples from locations in the field or section of interest (e.g., section 408) in a manner such that the sample locations collectively resembles a "Z" pattern. Another geometric-type pattern is an "hourglass" pattern (not shown), whose sample locations collectively resembles an hourglass. FIG. 5B depicts a random collection pattern. As the name indicates, a random collection pattern generally requires a person to collect samples at random or pseudo-random locations in the field or section of interest.

FIG. 5C depicts a stratified random collection pattern. In a stratified random pattern, the field or section of interest is further partitioned into a number of subsections, or strata (here, four strata 508a-d). In conventional practice, strata are specified on the field or section such that the number of samples/sample locations in each strata, Nstrata, is the same or nearly the same, and obtained by simply dividing NT by the number of strata. In this example, NT=32 and Nstrata is 32/4=8, as shown.

Exemplary Sample Planning and Tracker

With reference now to FIGS. 6A and 6B, shown is mobile device 600, a non-limiting embodiment of mobile device 224, configured to provide user interfaces/screens 601, 602 as part of a system (e.g., a system 200 embodiment) according to one or more embodiments of the present disclosure. Note that unless context suggests otherwise, the terms "screen" and "user interface" are used interchangeably herein. While specific embodiments of user interfaces are described and shown in FIGS. 6A & B, the reader will appreciate that any suitable layouts, interface elements, map elements (e.g., markers, annotations), designs, etc. sufficient to accomplish the functions described in relation to screens 601, 602 may be employed and still be within the scope of the description herein.

Using screen 601, a user (e.g., farmer, food safety specialist, etc.) may select/identify the desired agriculture area (e.g., field, section/lot or subsection/sublot) from which test samples are to be collected. In some embodiments, screen 601 is configured such that a user may enter information (or select from a dropdown list, scrolling list, etc.) identifying the desired field and lot using input elements 604 and 608, respectively. In other embodiments, a user may verify that the device's current location, in terms of section/lot, is the desired section/lot for sample collection.

Using screen 601, the user may trigger the system to generate (determine) a food safety sampling plan for the user-selected agriculture area by, for example, interacting with a UI element (e.g., button 612) of screen 601. In one or more embodiments herein, the system (e.g., sampling plan module 812) is configured to generate sampling plans tailored to each user-selected agriculture area (e.g., field or section/lot), as described in more detail below. As used herein, a generated sampling plan may include, but is not limited to, a set of locations, S, in the selected agriculture area from which samples should be collected by the user—which locations may generally be referred to hereinafter as "sample collection locations", $s_{i,j}$, and which set, S, may generally be referred to hereinafter as a "sampling set".

Generally, the system may present the generated sampling plan or sampling plan information to the user in any suitable manner sufficient to provide the functionality described herein. With reference to FIG. 6B, in one or more embodiments, the system may provide at least one user interface (e.g., screen 602) that displays a sampling plan or sampling plan information (e.g., a generated sampling set) to a user. In one non-limiting example, screen 602 displays a map 616 (or portions/tiles thereof) of the user-selected agriculture area (e.g., lot 408 of field 104) overlaid or otherwise demarcated with UI elements and/or UI information based on the generated sampling plan for that agriculture area. For example, the system may overlay the map (or portions/tiles thereof) with one or more visual elements 620 (e.g., in this example, partially transparent and/or shaded circles) showing/marking each sample collection location, $s_{i,j}$, in the generated sampling set, S. The system may also present a visual indicator (e.g., element 624) overlaid on map 616 showing the user's current location, so as to assist the user in physically finding the sample collection locations in the agriculture area by tracking/evaluating his current position in relation to a visual elements associated with sample collection locations.

In one or more embodiments, S (the set of generated sample collection locations, $s_{i,j}$) is a subset of a set of potential collection locations, G, determined for the selected agriculture area, wherein G is referenced hereinafter as the "sampling grid" for the selected agriculture area and each potential collection location may hereinafter be referred to as a "grid location" or "grid element", gi,j. In other words, in one or more embodiments:

$$S \subset G \qquad (1)$$

In general, G may be determined in any suitable manner sufficient to provide the functionality disclosed herein.

With reference to FIGS. 7A-7D, a few exemplary manners of defining and/or determining sampling grids, G, are described. Area 700 represents a portion of an exemplary agriculture area (e.g., lot 408 of field 104), and crops 404 represent exemplary row crops—e.g., lettuce, cabbage, etc., wherein length dl is a characteristic distance between each crop. In some embodiments, as illustrated by FIG. 7B, sampling grid G is a set of potential sampling locations 702*a* that is equal to or approximately equal to the set of physical locations of crops 404. In other words, in this embodiment, each member gi,j in the sampling grid set, G, comprises coordinates for a location 702*a* that is approximately equal to the physical coordinates of a location 404 for an individual crop. Hereinafter, this type of sampling grid may be referenced as an "identity"—type sampling grid, since it represents an identical, or approximately identical, set as the set of crop locations.

Generally, embodiments of the system (e.g. system 200) disclosed herein may utilize any suitable manner of specifying and generating an identity-type sampling grid set G for a given agriculture area (e.g., section/lot). For example, in some embodiments, an identity-type sampling grid set G for an agriculture area may be generated by utilizing a location set generated by and/or utilized by a precision planter to seed the area in question. In other embodiments, an identity-type set for an agriculture area may be generated from UAV survey information of the area, such as for example, a data set of coordinates locating each individual crop in the agriculture area. In other embodiments, a manual survey of crop locations for the agriculture area in question may be utilized.

It should be noted that in the embodiments disclosed herein, unless context suggests otherwise, the system is configured such that any sample collection location, sampling set element, potential collection location, or sampling grid element (collectively referenced hereinafter as "location elements") may be represented in the system as a two dimensional shape having at least one characteristic dimension and at least one characteristic point location coordinate. Generally, any suitable shape, characteristic dimension, and point location relative to the shape may be utilized to represent location element in the embodiments herein. Although generally any regular or irregular shape may be suitable, unless context suggests otherwise, the examples herein may be assumed to utilize regular shapes such as, e.g., polygons, circles, squares, and rectangles. Also, unless context suggests otherwise, in the examples disclosed herein it may be assumed that every location element in a sampling grid generated for a selected agriculture area (e.g. field or section) is identical in shape, size, and relative characteristic point location (e.g. center, centroid, east upper coordinate, etc). In some of the examples illustrating some of the embodiments disclosed herein, location elements are represented by rectangles or circles having a center characteristic point location and length and width (for rectangles) or radius (for circles) characteristic dimensions, unless context suggests otherwise. Embodiments of the systems herein may generally be configured to handle the foregoing location element geometric attributes in any suitable manner sufficient to provide the functionality herein. For example, in some embodiments, geometric attribute information may be included in sampling grid and/or sampling set information. In some embodiments, geometric attributes may be addressed as parameters in one or more system components, such as a sampling plan module, described further below.

Turning to FIG. 7C, another exemplary and non-limiting manner of defining a type of sampling grid G is illustrated. As shown, linear columns of grid locations may be defined on an agriculture environment (e.g., section/lot 408, as illustrated in FIG. 7C on portion 700). An exemplary manner of defining such linear columns is to utilize axes, such as axis 712, located in a manner to define grid elements that work to encompass a sufficient number of crops for a given agriculture area. For example, for crops planted in beds or rows, axes may be located along the centerlines of each bed or row, such as axis 712. Using the axes, grid locations may be defined using generally any suitable manner. For example, polygons or circles may be defined along the axes that represent grid locations. In particular, as shown in FIG. 7C, locations 702*b* may be defined along the axis and spaced apart a characteristic dimension—for example, the diameter (2r2) of a characteristic circular grid element 708 that is closely or nearly-closely packed along the axis.

Turning to FIG. 7D, another exemplary and non-limiting manner of defining a type of sampling grid G is illustrated. As shown, closely packed columns of grid locations may be defined on an agriculture area (e.g., section 408, as illustrated in FIG. 7D on portion 700). An exemplary manner of defining such packed columns is to utilize bounding lines (or, in some embodiments, bounding rectangles), such as lines 716*a,b*, located in a manner to define grid bounding columns that work to define grid elements that encompass a sufficient number of crops for a given agriculture area. For example, for crops planted in beds or rows (especially beds having multiple crops planted across the transverse axis), bounding lines/rectangles may be located along each lateral axis of each bed or row, such as bounding lines 716*a,b*. Using the bounding lines, grid locations may be defined using generally any suitable manner. For example, polygons or circles may be defined between the bounding lines along the entirety of the column that represent grid locations. In particular, as shown in FIG. 7D, locations 702*c* may be defined in closely or nearly closely packed rows along the entirety of the column bounded by boundary lines 716*a,b* and spaced apart a characteristic dimension—for example, the diameter (2r2) of a characteristic circular grid element 720 that is closely or nearly-closely packed with neighboring grid elements.

It should be noted that generally any suitable manner of defining sampling grids and grid elements sufficient to permit the functionality described herein may be utilized in the embodiments. For example, in agriculture areas that are planted in a broadcast manner or that otherwise are not planted in rows, grid G may be defined by locations that define shapes/areas (e.g., polygons or circles) that are closely or nearly closely packed across the entire agriculture area (e.g., field, section or subsection).

The system described in the embodiments (e.g., system 200) may generally implement and store sampling grids, G, and sampling sets, S, in generally any suitable manner sufficient to permit the functionality described herein. In some embodiments, the system may store characteristic points as GNSS coordinates (e.g., at least latitude and longitude) in an ordered list for the selected agriculture area, and separately store (e.g., as a local or global parameter associated with the agriculture area or grid) one or more associated parameters defining one or more characteristic dimensions for a representational shape of each grid element—e.g., a radius of a characteristic circular element, such as radii r1-r3 of circular elements 704, 708, and 720 in FIG. 7. Note that while circular elements may be preferable for system embodiments architected using non-spatial databases (e.g. SQL, NoSQL, relational, document-oriented databases), other elemental shapes/types may be useful for spatial databases (e.g. graph geospatial databases such as Neo4j), such as rectangles. Unless context suggests otherwise, the embodiments herein will be described assuming circular elements, as shown in FIGS. 7A-D.

In general, any suitable characteristic dimension(s) and value(s) may be utilized for a sampling grid's elemental shape, sufficient to permit the functionality described herein. In some exemplary embodiments, the system is configured to utilize 2D circular sampling grid elements which are preferably defined and stored using at least a centerpoint GNSS coordinate (e.g., latitude, longitude for centerpoint 702 in FIG. 7) and an associated radius, r. In one or more embodiments, the value of the characteristic dimension (e.g. radius) is determined based upon one or more of the following factors: the accuracy of the system's GNSS, the crop type characteristics (e.g., average characteristic width), the planting spacing/configuration of the crop, regulatory considerations, and system storage and/or processing limitation considerations.

In one or more embodiments, the system may be configured to have a relatively high GNSS accuracy—e.g., an accuracy radius of between about 1 cm to about 5 cm. Exemplary configurations having relatively high GNSS accuracy include those using RTK corrected GNSS receivers, such as e.g., an Emlid® Reach receiver or Eos Arrow Series® receiver. In some embodiments, the system may b configured to have a relatively standard GNSS accuracy—e.g., an accuracy radius of between about 9 ft to about 21 ft. Exemplary configurations having relatively standard GNSS accuracy include those relying on standard mobile device GNSS receivers. Generally, in systems having relatively high GNSS accuracy, the characteristic dimension of the sampling grid's elemental shape may be configured based primarily upon a characteristic dimension (e.g., canopy width) of the planted crop in question. For example, for head crops (e.g., lettuce, cabbage, etc.), the characteristic dimension (e.g., radius) of the sampling grid elemental shape (e.g., circle) may be set to a value that is relatively small. In some embodiments, it may be set to a value between about 1 inch to about 60 inches; in others, from about 2 inches to about 24 inches; in others, from about 6 inches to about 12 inches. Also generally, in systems having relatively standard GNSS accuracy, the characteristic dimension of the sampling grid's elemental shape may be configured based primarily upon the accuracy limit of the GNSS receiver.

Exemplary Device

Figure 8:
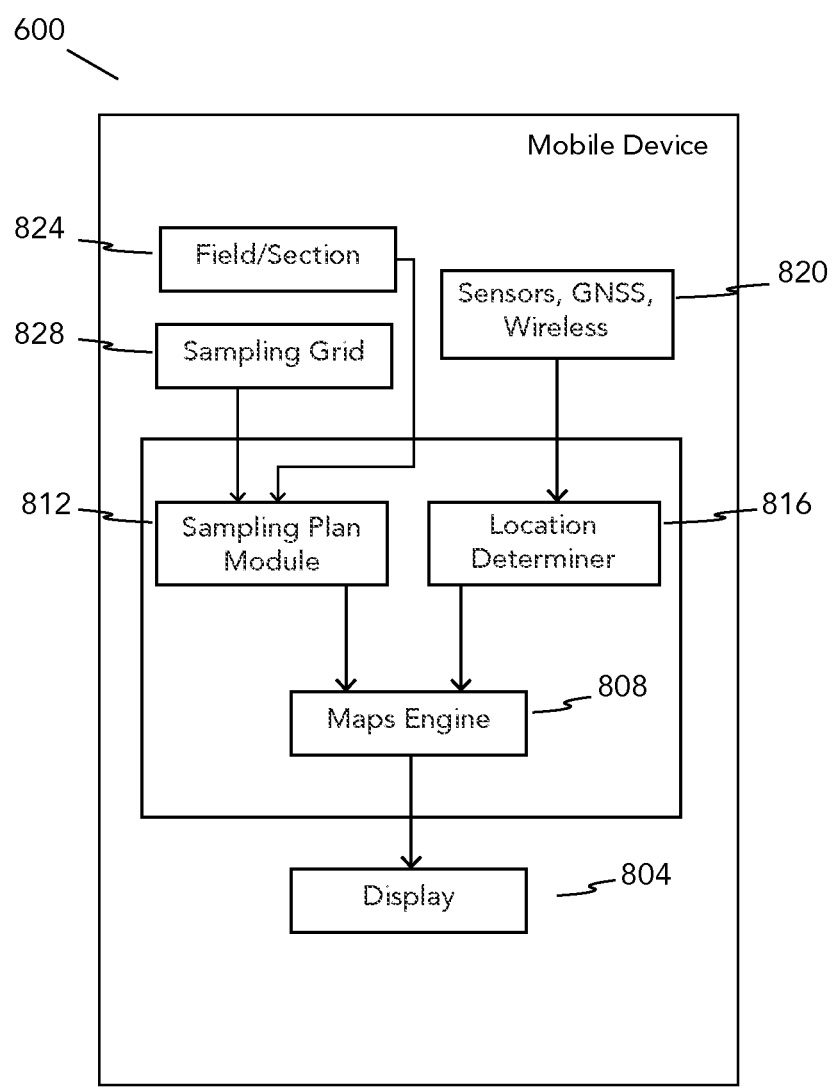
FIG. 8 shows a block diagram illustrating components of an exemplary mobile device according to some embodiments of the present disclosure.

FIG. 8 shows a block diagram illustrating certain components and subsystems (which themselves may contain one or more components) of exemplary mobile device 600. Mobile device 600 may include one or more processors and a computer-readable storage medium storing instructions executable by the one or more processors to perform operations described herein. Additional details about mobile device 600 architecture are described above with reference to FIG. 3B. Mobile device 600 may include multiple subsystems and/or components, each of which may be implemented as computer instructions executable by the one or more processors.

Mobile device 600 may include a maps engine 808 to provide maps data for rendering on touchscreen display 804 (directly or indirectly via one or more UI components, subsystems or applications) all or portions of sample collection tracker screens according to one or more embodiments herein, such as screen 602. Maps engine 808 may be connected to a local or external maps database and/or service (not shown) storing and serving map data such as map tiles and/or map data for rendering map artifacts such as streets, etc. In one or more embodiments, maps engine 808 receives sampling plan information from sampling plan module 812. In general, sampling plan module 812 is configured to generate or obtain sampling plans for user-selected agriculture areas (e.g., fields and/or sections) and provides sampling plan information for rendering on display 804 in connection with map information for the field/section of relevance (e.g., the field and/or section selected by a user of device 600). In some embodiments, sampling plan information may include, but is not limited to, location information (e.g., latitude and longitude coordinates) of sample collection locations, si,j, of sampling set, S, generated for the field/section of relevance. In one or more embodiments, sampling plan information may also include relevant sampling grid elemental shape information, such as e.g., a shape index and/or characteristic dimension(s) data (e.g., a characteristic radius, ri,j), for each sample collection location. In some preferred embodiments, the characteristic shape information may be a preconfigured parameter(s), such as a characteristic radius, r, associated with all the grid locations (including sample collection locations si,j) for the field and/or section of relevance that is available to one or more relevant components on mobile device 600 to use in rendering the sampling plan information on display 804, as described in more detail in relation to FIG. 7.

With continuing reference to FIG. 8, mobile device 600 may include location determiner 816 that is configured to determine and/or provide current location data (including, in some embodiments, motion data) for mobile device 600 to other components, including maps engine 808. Location data determined and/or accessed by location determiner 816 may be obtained via one or more GNSS, sensor, and/or wireless subsystems 820 (e.g., GNSS subsystem 374, sensor subsystem 362, communication subsystem 354), as described in more detail in relation to FIG. 3B. In one or more embodiments, based on the current location data provided by location determiner 816 and sampling plan information obtained from sampling plan module 812 for the current location in the user-selected field/section, maps engine 808 may determine and provide suitable map information for rendering a relevant map of the selected field/section on display 804, overlaid with one or more elements visually representing sample collection locations (e.g., visual elements 620) and the device current location (e.g., visual indicator 624), as shown and described in more detail in relation to FIG. 6B.

Referring still to FIG. 8, generally sampling plan module 812 may be configured to determine sampling plans in any suitable manner sufficient to permit the functionality disclosed herein. In one or more embodiments, sampling plan module 812 may utilize field and/or section information 824 (e.g., a section index) of the field and/or section selected by a user using mobile device 600 (e.g., using screen 601) to obtain sampling grid information for the selected field and/or section. In some embodiments, sampling grid information comprises sample grid, G, for the selected field and/or section. In some embodiments, sampling grid information may also include elemental shape information for the grid elements such as, e.g., characteristic dimension (e.g., radius r), for the sample collection locations in the selected field and/or section. Sampling grid information may be stored locally in some embodiments or remotely in others (e.g., in database 220, accessed over network 228), and indexed or accessed in any suitable manner (e.g., via field/section indexed tables or documents). In some embodiments, sampling plan module 812 may generate the sampling grid information using field and/or section information 824.

In general, sampling plan module 812 may be configured to generate sampling plan information for a selected field and/or section in any suitable manner sufficient to provide the functionality described herein. For example, in one or more embodiments, sampling plan module 812 may be configured to generate one or more sampling sets, Si, for a selected agriculture area based on one or more models (not shown), such as, e.g., a pattern generating model (e.g., Z-pattern), a random model, and/or a stratified random model.

Exemplary Traceability

Figure 9C:
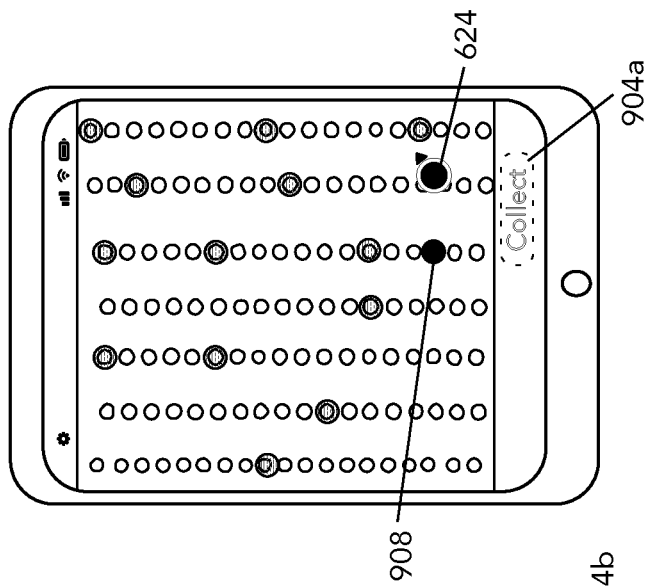
FIG. 9C illustrates an exemplary user interface that may be used in accordance with embodiments of the present disclosure.
Figure 9B:
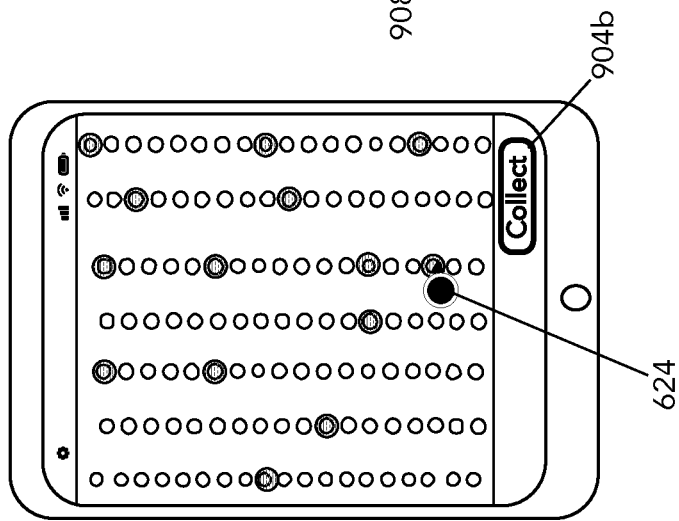
FIG. 9B illustrates an exemplary user interface that may be used in accordance with embodiments of the present disclosure.
Figure 9A:
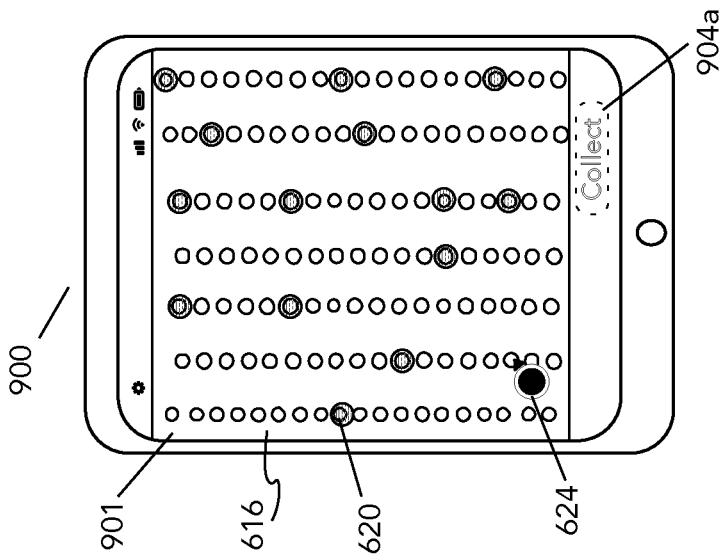
FIG. 9A illustrates an exemplary user interface that may be used in accordance with embodiments of the present disclosure.

One or more embodiments of the system and method disclosed herein have sample collection traceability and compliance aspects and functionality, as further described hereinafter. With reference to FIGS. 9A-C, shown is mobile device 900, a non-limiting embodiment of mobile device 224, configured to provide user screen 901 as part of a system according to some embodiments of the present disclosure. Similar to screen 602 of the embodiment illustrated in FIG. 6B, the system may provide, via screen 901, a map 616 (or portions/tiles thereof) of the user-selected agriculture area (e.g., section 408) overlaid or otherwise demarcated with UI elements 620 and/or UI information based on the generated sampling plan. Mobile device 900 may be configured so that screen 901 may also present a visual indicator (e.g., element 624) overlaid on map 616 showing the user's current location, so as to assist the user in physically finding the sample collection locations in the field.

Additionally, mobile device 900 may be configured such that screen 901 alters the appearance of any visual indicator 620 once the user has visited the sample collection location demarcated by the visual indicator and/or satisfied one or more sample collection compliance criteria for sample collection relevant to that sample collection location. For example, in one or more embodiments, device 900 may update and alter the visual appearance of any sample collection location visual indicator 620 by, e.g., changing its color, shape, content, and/or texture, once one or more sample collection compliance criteria have been satisfied for that sample collection location.

Generally, any suitable sample collection criteria may be utilized by the system and method disclosed herein. In some embodiments, sample collection criteria may include, but are not limited to, any of the following. A first sample collection compliance criterion may be satisfied when mobile device 900 has been physically located to be within a preconfigured food safety radius, rs, of a sample collection location, during a current food safety collection session (e.g., within a preconfigured period of time, such as 24 hours, from the generation of a food safety plan for the section). In one or more embodiments, the food safety radius may have a value within a range from: (1) a characteristic dimension of the sampling grid's elemental shape (e.g., ri,j) to (2) twice the GNSS accuracy radius of the device if the device has a relatively standard GNSS accuracy. A second sample collection compliance criterion may be satisfied when mobile device 900 has been located to be within the aforementioned preconfigured food safety radius for at least a predetermined dwell time, tdwell. In some embodiments, predetermined dwell time, tdwell, is selected such that it is indicative of an average time lapse needed for a user to collect a sample from the crop in question. A third sample collection compliance criterion may be satisfied when mobile device 900 has been located to be within the preconfigured food safety radius and motion sensor data output in the same time frame is indicative of sample collection activity. For example, such motion sensor data output may comprise data indicative of characteristic oscillation and/or elevation change (as from, e.g. stooping over or placing the device on the ground).

In one or more embodiments, in addition to (or instead of) altering the visual appearance of any sample collection location visual indicator 620 to indicate compliance with one or more sample collection compliance criteria for that location, mobile device 900 may be configured to provide an interface element (e.g., button 904) or other mechanism that allows for the user to manually verify that a sample collection has occurred at a given sample collection location. In one or more exemplary embodiments, the device is configured such that the interface element only allows for user verification upon the satisfaction of one or more sample collection compliance criteria, such as the previously mentioned criteria. For example, and with reference to FIG. 9, mobile device may be configured to provide a binary UI element (e.g., button 904) that is capable of being in either a first/disabled state or a second/enabled state, depending on whether one or more preconfigured sample collection compliance criteria have been satisfied. In some embodiments, the default state of binary UI element (e.g., button 904) is the first/disabled state, as illustrated by button 904a in FIGS. 9A and 9C. In the disabled state, the binary UI element does not allow for user interaction (e.g., tapping of button 904). However, whenever one or more preconfigured sample collection compliance criteria have been satisfied, binary UI element (e.g., button 904) updates/changes to a second/enabled state, as indicated by button 904b in FIG. 9B. In the second state, the binary UI element allows for user interaction (e.g., tapping) to trigger an event such as the logging of a timestamp and location information and/or sample collection location identifier information for the binary UI element. With reference to the exemplary embodiment illustrated in FIG. 9, button 904 is in a first, default state, 904a, unless and until mobile device 900 is within a preconfigured sample collection radius of a sample collection location 620, as indicated by the position of UI element 624 in FIG. 9B. In FIG. 9B, button 904 is in a second, enabled state. As indicated in FIG. 9C, once the user (not shown) has tapped button 904b, the relevant visual element 620 has changed appearance (color), as indicated by element 908.

Exemplary Device Having Traceability

Figure 10:
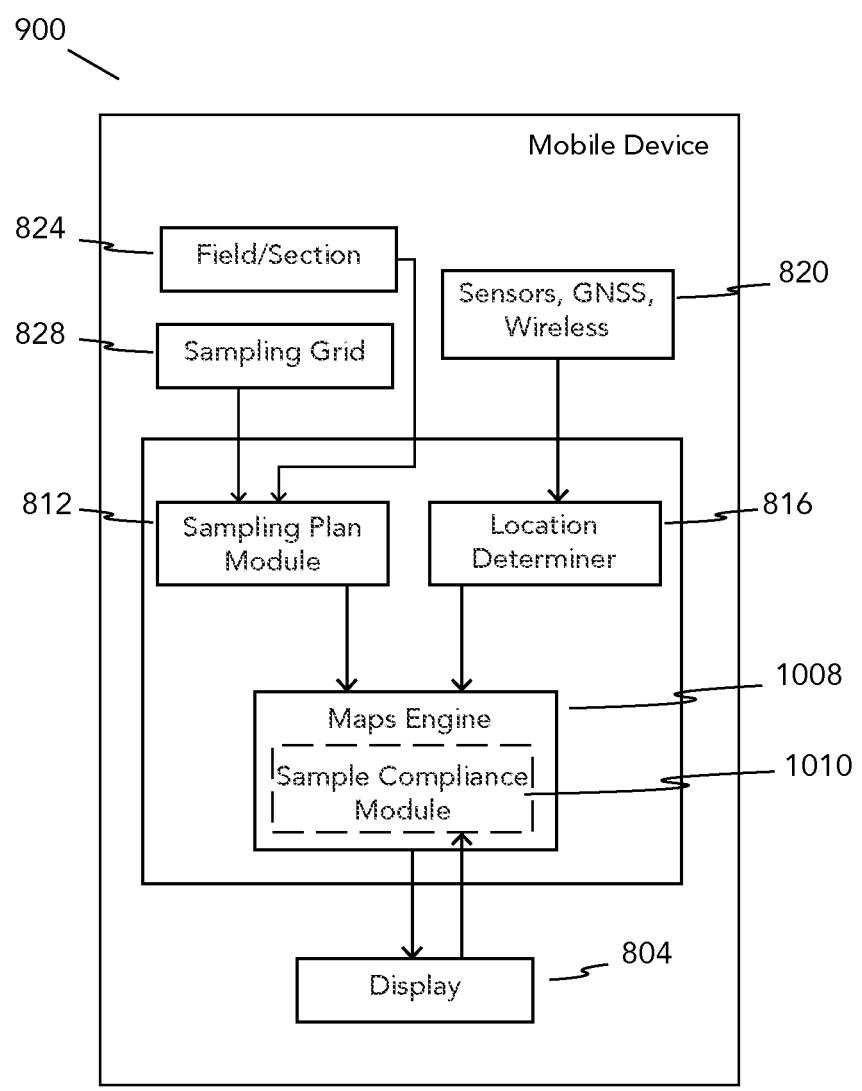
FIG. 10 shows a block diagram illustrating components of an exemplary mobile device according to some embodiments of the present disclosure.

FIG. 10 shows a block diagram illustrating certain components and subsystems (which themselves may contain one or more components) of exemplary mobile device 900. Mobile device 900 may include one or more processors and a computer-readable storage medium storing instructions executable by the one or more processors to perform operations described herein. Additional details about mobile device 900 architecture and functionality are described above with reference to FIG. 3B and FIG. 8. Mobile device 900 may include multiple subsystems and/or components, each of which may be implemented as computer instructions executable by the one or more processors.

Other than for the components and subsystems needed to provide the traceability and compliance functionality described in relation to FIG. 9, description of the components and subsystems of device 900 is provided above in relation to device 600 in FIG. 8.

With reference to FIG. 10, in one or more embodiments maps engine 1008 may provide maps data for rendering on touchscreen display 804 (directly or indirectly via one or more UI components, subsystems or applications) all or portions of sample collection tracker screens according to one or more embodiments herein, such as screen 901. Maps engine 1008 may be connected to a local or external maps database and/or service (not shown) storing and serving map data such as map tiles and other data for rendering map artifacts such as streets, etc. In one or more embodiments, maps engine 1008 receives sampling plan information from sampling plan module 812 and location data, including current location data (which includes in some embodiments, motion data) from location determiner 816.

Additionally, mobile device 900 may include one or more components or subsystems to provide the traceability and compliance functionality described in relation to FIG. 9. In some embodiments, one or more sample compliance modules 1010 may be included as part of map engine 1008, although in general any suitable architecture sufficient to provide the described functionality may be utilized in the embodiments disclosed herein. In one or more embodiments, compliance module 1010 provides, directly or indirectly, UI element 904 to display 804 and manages its binary state by managing and enforcing the one or more sample collection compliance criteria described above in relation to FIG. 9.

Generally, compliance module 1010 may manage and enforce the one or more sample collection compliance criteria in any suitable manner sufficient to provide the functionality described herein. For example, in some embodiments, module 1010 may run a process that monitors current position data of device 900 and compares it to all or a portion of sample collection set, S, for the given sample collection area (field or section)—e.g., computes a current proximity value to each sample location—and enables UI element 904 if and when a comparison value is less than the preconfigured food safety radius, rs, associated with the sample collection area (field or section). In some embodiments, module 1010 enables UI element 904 if and when a comparison value is less than the preconfigured food safety radius, rs, associated with the sample collection area (field or section), and a dwell time and/or motion criteria have been satisfied. Also in some embodiments, module 1010 may monitor or receive an alert when and if a user has triggered (e.g., pressed) an enabled UI element 904 and logs such event.

Generally, device 900 may log or record compliance with the one or more sample collection criteria in any suitable manner sufficient to provide the functionality described herein. In one or more embodiments, module 1010 writes to a log file, database record, and/or a similar data structure at least (1) a timestamp and (2) location and/or sample collection set element identifier whenever a UI element 904 has been triggered. Such log files and/or database records may be stored locally or remotely (e.g., in storage 218 and/or database(s) 220) and indexed by field and/or section.

Exemplary Food Safety Audit

In some embodiments disclosed herein, system 200 may be configured to input and store food safety audit information (food safety risk factor information resulting from one or more audits for a particular growing area) in a manner sufficient to index or link it to the particular fields and/or sections of an agriculture area to which the audit information is relevant (e.g., the fields and/or sections in which the audit was performed by a user). Generally, system 200 may store any food safety audit information that is capable of being indexed or linked to a field and/or section. Non-limiting examples of food safety audit information are described herein in relation to FIGS. 11 and 12.

Referring to FIG. 11A, shown is an example of a proximity-type food safety risk factor. Generally, proximity risk factors may be any food safety risk factor for a particular agriculture area that is characterized by the agriculture area's physical proximity to the risk in question. For example, FIG. 11A shows an exemplary dairy farm 1100 in proximal relation to agriculture area 100. More particularly, as shown, dairy farm 1100 comprises a plurality of proximity risk factors—for example, at least the dairy shed 1102a and feed trough 1102b (e.g., areas where cattle may congregate)

Figure 11B:
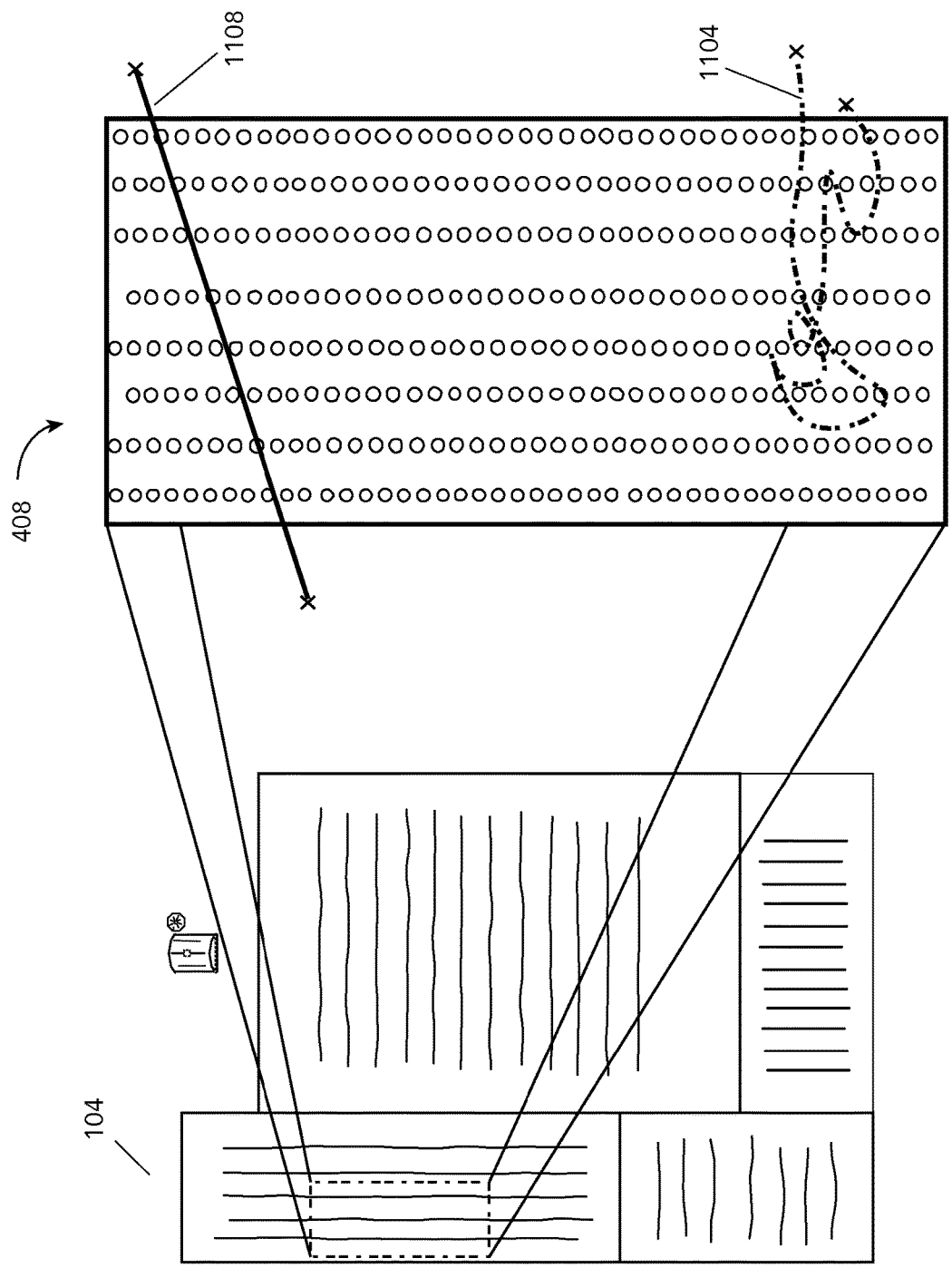
FIG. 11B shows a line drawing illustrating another view of the exemplary agriculture area of FIG. 4 including food safety risks, useful for certain embodiments in accordance with the present disclosure.

FIG. 11B illustrates an exemplary static-type food safety risk factor and an exemplary variable-type food safety risk factor. Generally, static risk factors may be any food safety risk factor for a particular agriculture area that is characterized by its presence during the entirety of a growing season, and variable risk factors may be any food safety risk factor for a particular agriculture area that is characterized by its changing presence/absence during a growing season. For example, FIG. 11B depicts a portion of overhead wire 1108, an exemplary static risk factor, that extends over a portion of the agriculture area, section 408 of field 104. Additionally, FIG. 11B depicts animal incursion tracks 1104, a variable risk factor, that extend over a portion of the agriculture area, section 408 of field 104. As may be appreciated, proximity risk factors may typically be classified as a static-type food safety risk factor.

Figure 12A:
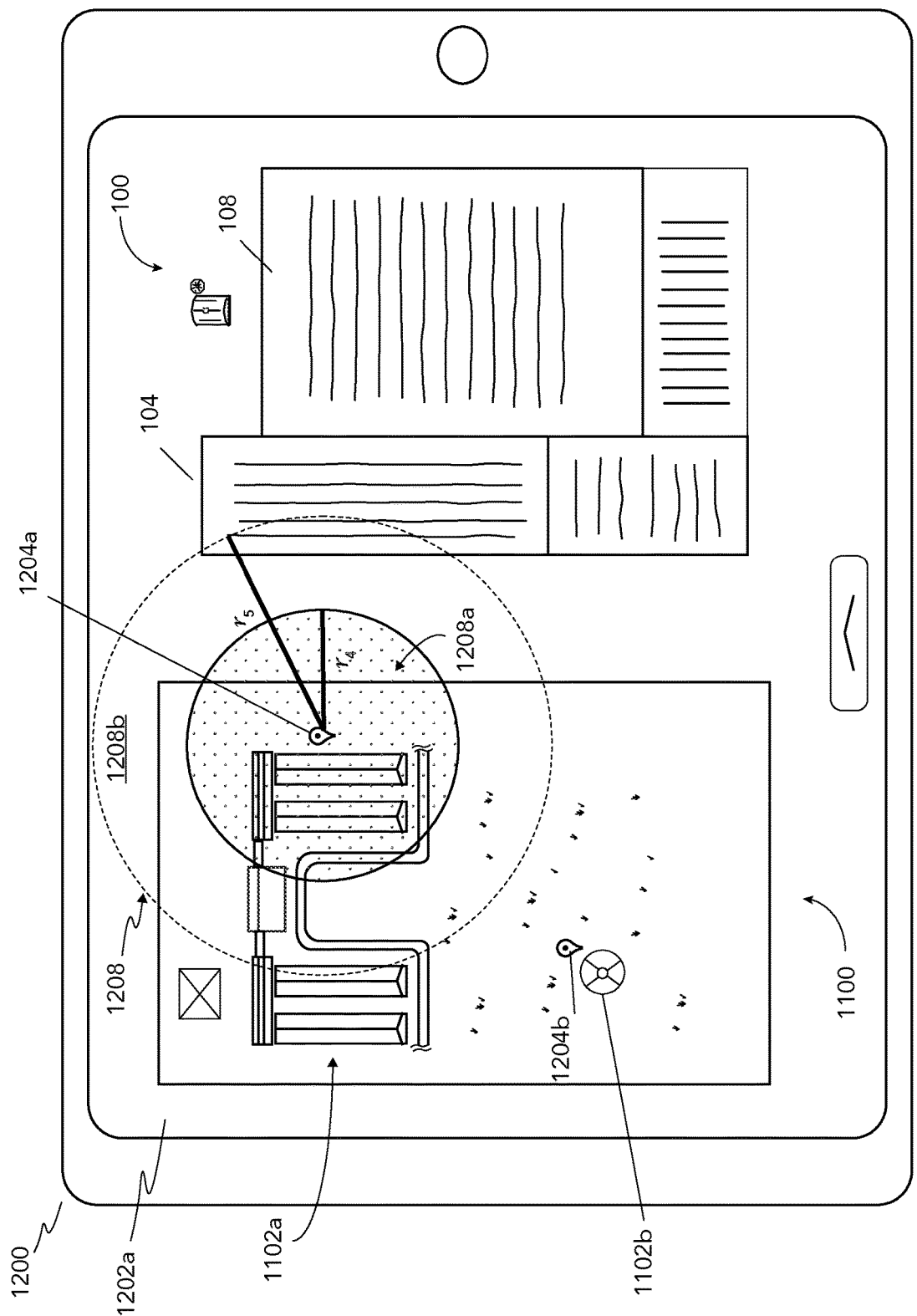
FIG. 12A illustrates an exemplary user interface that may be used in accordance with embodiments of the present disclosure.

Referring now to FIG. 12A, shown is mobile device 1200, a non-limiting embodiment of mobile device 224, configured to provide screen 1202a as part of a system according to some embodiments of the present disclosure. In one or more embodiments, screen 1202a may display a map and/or map information of an agriculture area and provide one or more UI and/or map elements that allow for user interaction to perform a food safety audit or portion of a food safety audit of the agriculture area. For example, in this example, screen 1202a displays a map of dairy farm 1100 and agriculture area 100. Note that in this example the two areas (dairy 1100 and farm 100) are proximal each other with no intervening environments; however, a person of ordinary skill will understand that proximity risks need not be immediately proximal an audited area.

Using device 1200, a user (e.g., an audit user or admin) may configure one or more food safety proximity risk markers in relation to an audited area (e.g., farm 100, field 104 and/or section 408). In general, any suitable manner of configuring proximity risk markers may be utilized in the embodiments herein to accomplish the functions described. For example, in relation to the embodiments illustrated in FIG. 12A, a user may place one or more map marker elements (e.g., pins/markers 1204a,b) on the map using screen 1202a to mark the locations of proximity risks. As shown, markers 1204a and 1204b have been placed on screen 1202a by a user to mark the locations of dairy shed 1102a and feed trough 1102b, respectively. In this exemplary embodiment, markers 1204 may be configured to include one or more proximity zones, such as proximity zones 1208*a* and 1208*b* of marker 1204*a*. In some embodiments the proximity zones for proximity zone markers may be preconfigured by marker type (e.g., dairy marker). In other embodiments, a user may configure individual markers or override preconfigured values using device 1200. For example, in this embodiment, a user may set the radius of each proximity zone of marker 1204, as depicted zone radii, r4 and r5, of proximity zones 1208*a* and 1208*b*. It should be noted that device 1200 may be configured to provide proximity markers that allow for generally any number of proximity zones; for example from 0 to 5 proximity zones; in some embodiments from 1 to 3 proximity zones; in preferred embodiments a single proximity zone.

Figure 12B:
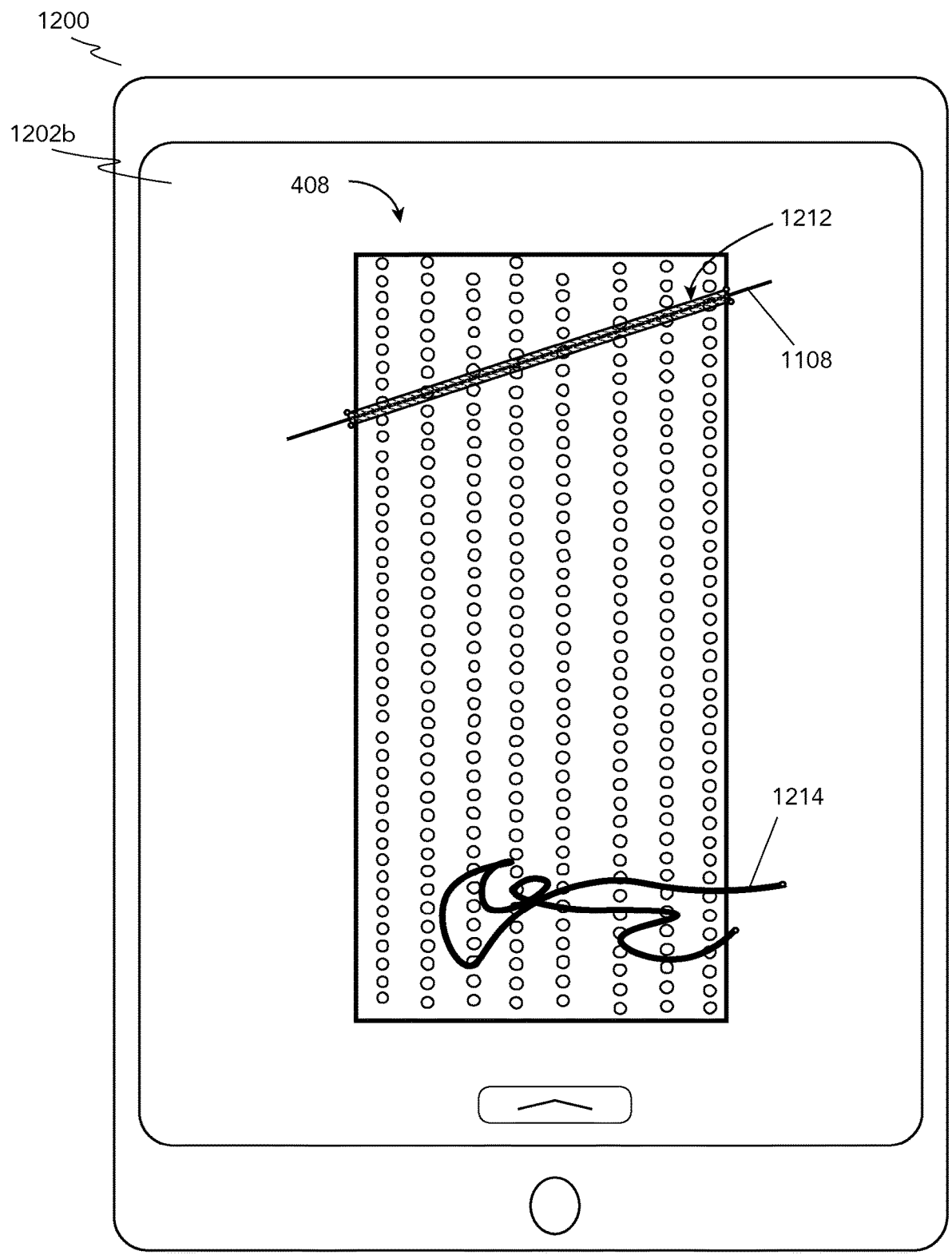
FIG. 12B illustrates an exemplary user interface that may be used in accordance with embodiments of the present disclosure.
Figure 12C:
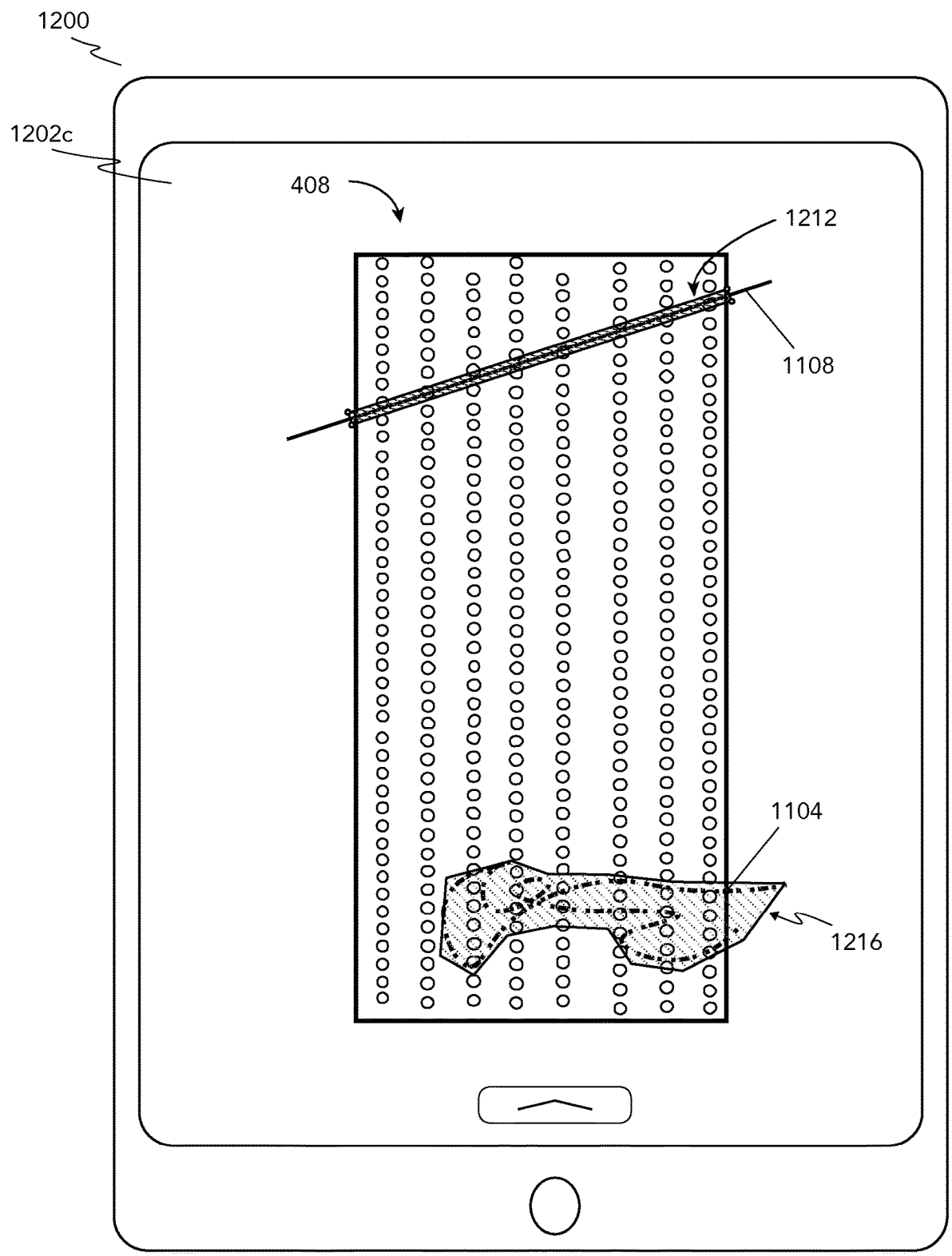
FIG. 12C illustrates an exemplary user interface that may be used in accordance with embodiments of the present disclosure.

FIG. 12B shows mobile device 1200 configured to provide screen 1202*b* as part of a system according to some embodiments of the present disclosure. In this example, screen 1202*b* displays a map of section 408 of field 104. Using device 1200, a user (e.g., an audit user or admin) may configure one or more food safety static and/or variable risk markers in relation to an audited area (e.g., section 408). In general, any suitable manner of configuring static and variable risk markers may be utilized in the embodiments herein to accomplish the functions described. In some non-limiting embodiments, a user may place one or more map annotation or overlay elements (e.g., circle, rectangle, polygon, line, segmented line, curved line) on the map to mark the locations and area of static or variable food safety risks. For example, in relation to the embodiments illustrated in FIG. 12B, a user may place an overlay element (e.g., rectangle 1212) to mark the location and area of overhead wire portion 1108 and another overlay element (e.g., curved line 1214) to mark the location and area of animal incursion tracks 804. FIG. 12C illustrates another exemplary overhead element, polygon 1216, to mark the location and area of animal incursion tracks 804.

In general, the system may structure, store and access food safety audit information in any suitable manner sufficient to provide the functionality of the embodiments described herein. In one or more embodiments, the system may store one or more collections/tables of documents/records of food safety audit information in one or more databases or other structured data storage. For example, with reference to FIG. 13, the system may store in one or more databases 1300 (e.g., a NoSQL type database) one or more collections 1304 of food safety audit documents 1308. The database/data storage may be local and/or remote from the mobile device 224. For example, in one or more embodiments, database 1300 may be an embodiment of database 220 of system 200, a backend or web application database for mobile device 224. In some embodiments, all or a portion of food safety audit information is stored locally on mobile device 224 in a mobile device database or structured data storage, such as, e.g., a local iOS database (not shown) for iPhone embodiments; in some embodiments, food safety audit information or portions thereof may be stored and synchronized across both local and remote databases.

Figure 13:
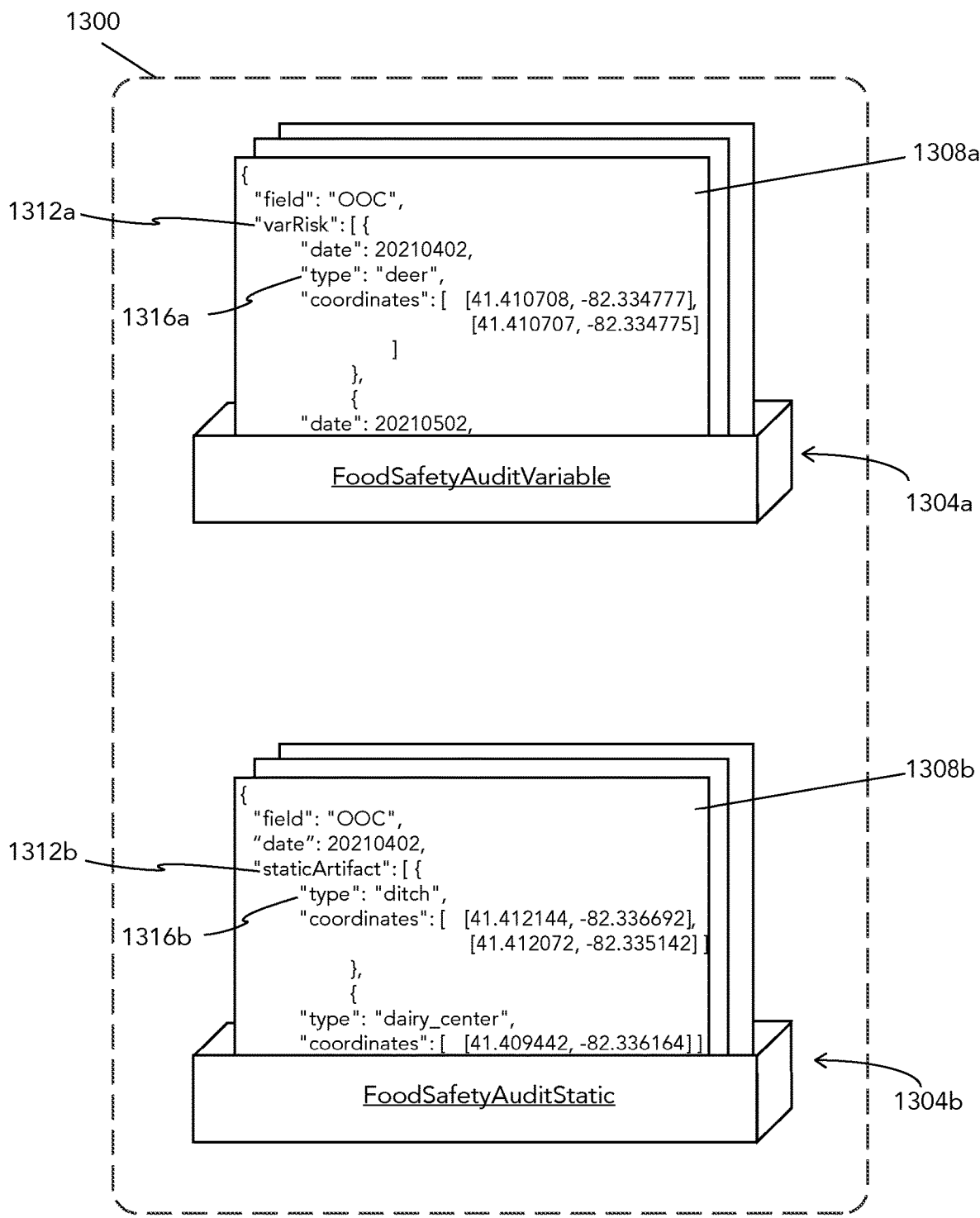
FIG. 13 shows a schematic drawing illustrating an exemplary manner of structuring certain food safety audit information, in accordance with embodiments of the present disclosure.

With continued reference to FIG. 13, in some exemplary embodiments, the system (e.g., system 200) may store food safety audit information in two collections/tables 1304*a* and 1304*b* containing documents/records 1308*a* and 1308*b* directed to variable and static audit risk factors, respectively. In some embodiments, both variable and static collections/tables 1304*a,b* have documents/records 1308 that store field and date information for risk factor entries 1312. In exemplary embodiments, the system primarily indexes food safety audit information by agriculture area (e.g., field) data. A person of ordinary skill in the art will recognize that food safety audit information may be differently structured and stored in fewer or more collections/tables and/or indexed differently (e.g., by farm or by section) and still be within the scope of the embodiments herein.

In some embodiments, food safety audit information may be structured to include individual or custom classes for different risk factors. For example, with reference to FIG. 13, variable risk factors 1312*a* may include a type of individual/custom class 1316*a* assigned to the particular variable risk factor in question, denoted in this example as a "deer" type of risk factor, indicative of a category/type of animal intrusion. Also for example, with reference to FIG. 13, static risk factors 1312*b* may include a type of individual/custom class 1316*b* assigned to the particular static risk factor in question, denoted in this example as a "ditch" type of static risk factor, indicative of a static artifact (a ditch) present in some areas. A person of ordinary skill in the art will appreciate that the system of the embodiments herein may generally be configured to include different custom classes that are indicative of the types of risk factors normally encountered in different environments, some of which are expressly mentioned herein, and still be within the scope of the embodiments disclosed. Additionally, each risk factor stored in document/record 1308 may generally include one or more geographic coordinates relevant to locating and specifying the risk factor in question.

Exemplary Device for Food Safety Audit

Figure 14:
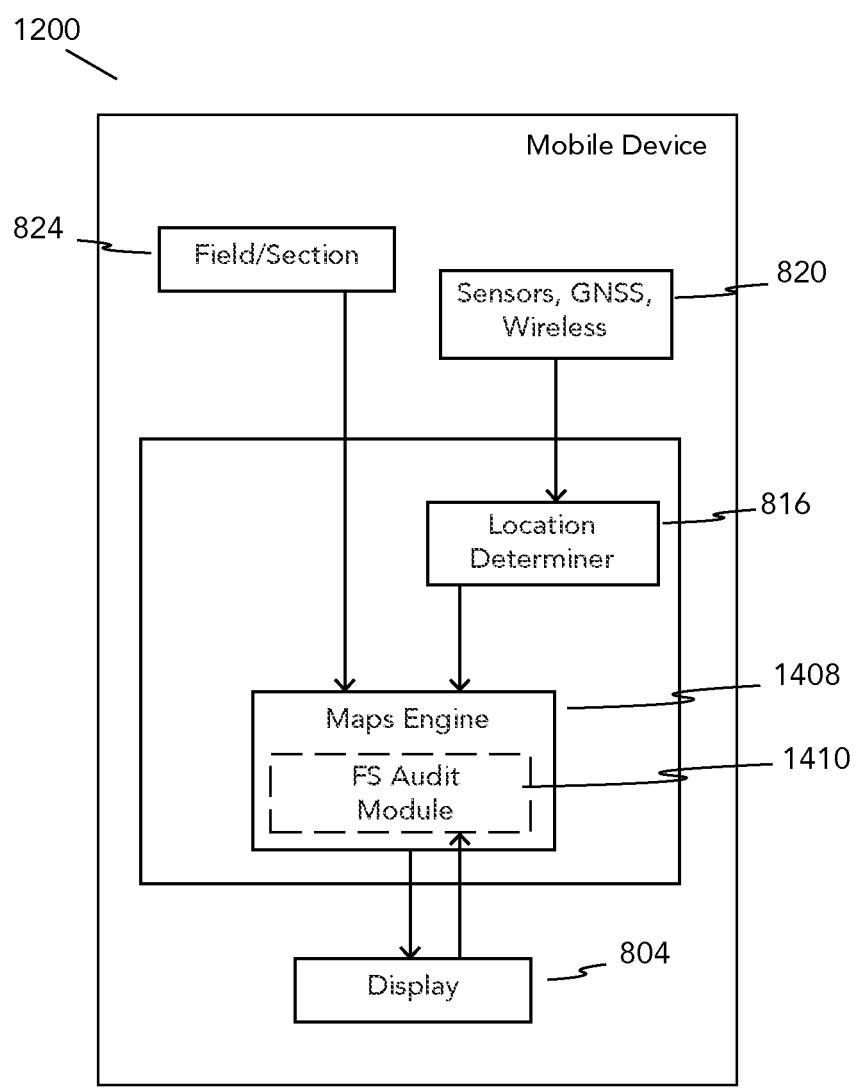
FIG. 14 shows a block diagram illustrating components of an exemplary mobile device according to some embodiments of the present disclosure.

FIG. 14 shows a block diagram illustrating certain components and subsystems (which themselves may contain one or more components) of exemplary mobile device 1200. Mobile device 1200 may include one or more processors and a computer-readable storage medium storing instructions executable by the one or more processors to perform operations described herein. Additional details about mobile device 1200 architecture and functionality are described above with reference to FIG. 3B and FIG. 8. Mobile device 1200 may include multiple subsystems and/or components, each of which may be implemented as computer instructions executable by the one or more processors.

Other than for the components and subsystems needed to provide the audit functionality described in relation to FIGS. 11-13, description of components and subsystems of device 1200 is provided above in relation to device 600 in FIG. 8.

With reference to FIG. 14, in one or more embodiments maps engine 1408 may provide maps data for rendering on touchscreen display 804 (directly or indirectly via one or more UI components, subsystems or applications) all or portions of food safety audit screens according to one or more embodiments herein, such as screens 1202*a-c*. Maps engine 1408 may be connected to a local or external maps database and/or service (not shown) storing and serving map data such as map tiles and other data for rendering map artifacts such as streets, etc. In one or more embodiments, maps engine 1408 receives location data, including current location data (which includes in some embodiments, motion data) from location determiner 816.

Additionally, mobile device 1200 may include one or more components or subsystems to provide the food safety audit functionality described in relation to FIGS. 11-13. In some embodiments, one or more food safety audit modules 1410 may be included as part of map engine 1408, although in general any suitable architecture sufficient to provide the described functionality may be utilized in the embodiments disclosed herein. In one or more embodiments, food safety audit module 1410 provides, directly or indirectly, food safety marker elements (e.g., pins 1204, rectangles 1212, curved lines 1214 and polygons 1216) to display 804 and receives and creates records/documents (e.g., documents 1308) of food safety marker information input by a user using display 804.

Exemplary Food Safety Grid

In one or more preferred embodiments disclosed herein, the system may be configured to determine one or more sampling plans for a selected agriculture area that are based in part on food safety audit information associated with that area. In some embodiments, in order to provide such functionality the system may be configured to associate one or more strata, or "food safety grids," F, with the area comprising a set of elements, fZ, that specify a grid or closely packed network of zones that is coextensive with the associated agriculture area and that has ZT number of grid cells, or "food safety zones", wherein each zone has a characteristic shape and area.

Figure 15B:
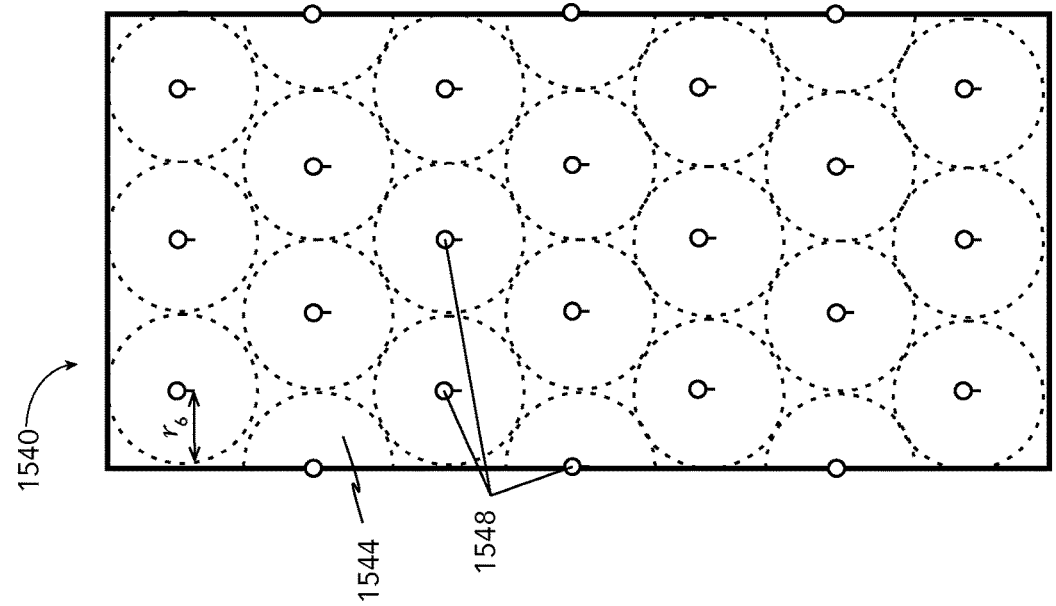
FIG. 15B shows a line drawing illustrating the exemplary agriculture area of FIG. 4 and including an exemplary food safety grid, useful for certain embodiments in accordance with the present disclosure.
Figure 15A:
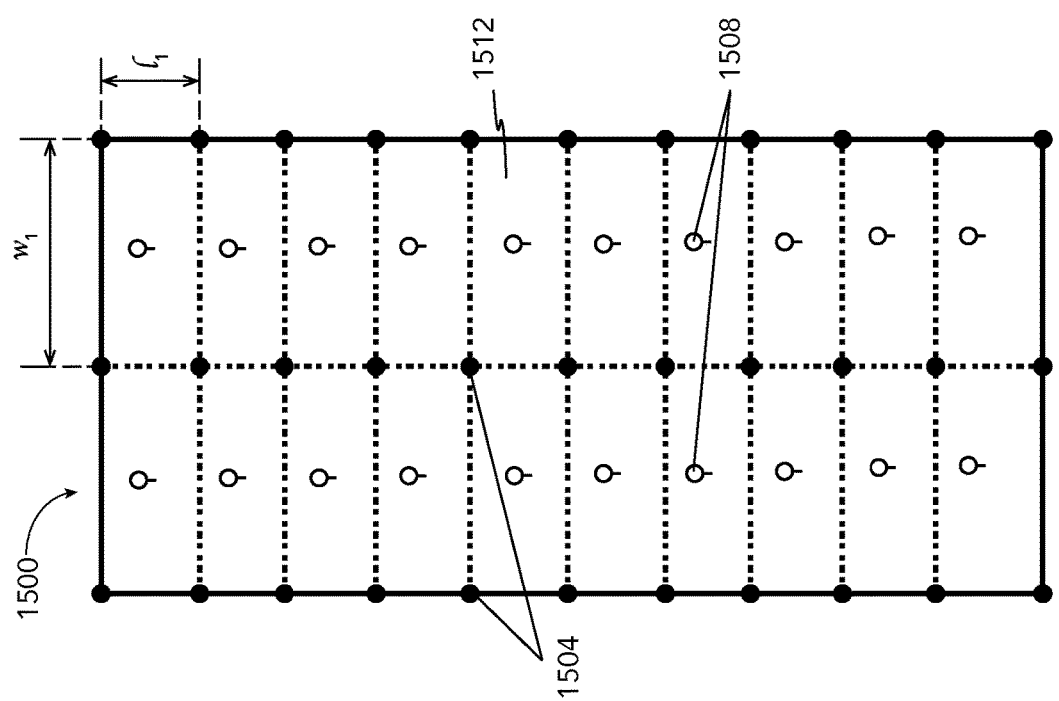
FIG. 15A shows a line drawing illustrating the exemplary agriculture area of FIG. 4 and including an exemplary food safety grid, useful for certain embodiments in accordance with the present disclosure.

In general, a food safety grid F for a given agriculture area, as well as the type, format and/or structure of data that comprises the grid's elements, fZ, may be determined in any suitable manner sufficient to provide the functionality disclosed herein. With reference to FIGS. 15A and 15B, a few exemplary manners of specifying and/or determining food safety grids, F, are described. In these examples, grids 1500 and 1504 have a simple rectangular geometry and are coextensive with their associated agriculture area, section 408 of field 104 of the system embodiments described herein.

Referring to FIG. 15A, food safety grid 1500 generally comprises a plurality of equal, rectangular food safety zones (grid cells), such as representative zone 1512. As may be appreciated, some exemplary system embodiments herein may be configured to specify a grid, F, such as grid 1500 by, for example, determining and storing the location coordinates of each grid node, such as nodes 1504 of grid 1500. Additionally and/or alternatively, some system embodiments herein may be configured to specify a grid, F, by, for example determining and storing the location coordinates of a reference point (e.g., east upper corner point, centerpoint, centroid (for irregular shapes), etc) for each zone, such as centerpoints 1508 of grid 1500. Regarding the latter example, system embodiments may also store (e.g., as parameters), one or more characteristic dimensions of the zones, such as a characteristic width w1 and characteristic length l1 of rectangular zone 1504 of grid 1500, and utilize such information along with reference point information to specify food safety grids.

Referring to FIG. 15B, food safety grid 1540 generally comprises a plurality of closely packed circular food safety zones, such as representative zone 1544. Similar to the grid 1500 examples, some exemplary system embodiments herein may be configured to specify a grid, F, such as grid 1540 by determining and storing the location coordinates of a reference point for each zone, such as centerpoints 1548 of grid 1540. Such system embodiments may also store (e.g., as variables or parameters), one or more characteristic dimensions of each zone, such as a characteristic radius r6 of circular zone 1544 of grid 1540, and utilize such information along with reference point information to specify food safety grids.

In general, in the systems of the embodiments herein, the shape of each food safety zone and overall attributes of each grid may be based on any number of suitable criteria sufficient to provide the functionality described herein. For example, in some embodiments, the system may be configured to provide a set of closely packed, simple polygons or circles that fill a grid that is coextensive with the selected agriculture area, such as in the examples shown in FIG. 15. Such zones and grids may be particularly suitable for agriculture areas with regular shape and with uniform planting. In some embodiments, the system may be configured to provide a set of closely packed, irregularly shaped, non-uniformly sized food safety zones that fill a grid that is coextensive with the selected agriculture area. Such zones and grids may be particularly suitable for agriculture areas with irregular shape and/or non-uniform planting. In one or more preferred embodiments, such as certain embodiments implementing the weighted strata random protocol described below in relation to FIGS. 16 and 17, the system is configured to provide food safety zones that specify a grid that is coextensive with a selected agriculture area in such a manner that each zone covers a geographic area that is represented in the system by an equal number or nearly equal number of sampling grid locations (potential collection locations).

The system described in the embodiments may generally implement and store food safety grids, F, in generally any suitable manner sufficient to permit the functionality described herein. In some embodiments, the system may store GNSS coordinates (e.g., at least latitude and longitude) in an ordered list for the selected agriculture area, and separately store (e.g., as a local or global parameter associated with the agriculture area or grid) one or more associated parameters defining one or more characteristic dimensions for a representational shape of each grid element/zone, fZ—e.g., a radius of a characteristic circular zone, such as radius r6 in FIG. 15B. Note that while circular zones may be preferable for systems architected using non-spatial databases (e.g. SQL, NoSQL, relational, document-oriented databases), other elemental shapes/types may be useful for spatial databases (e.g. graph geospatial databases such as Neo4j), such as rectangles and polygons. Unless context suggests otherwise, the embodiments herein will be described assuming circular zones.

Exemplary Sample Planning Using Audit Information

Figure 16:
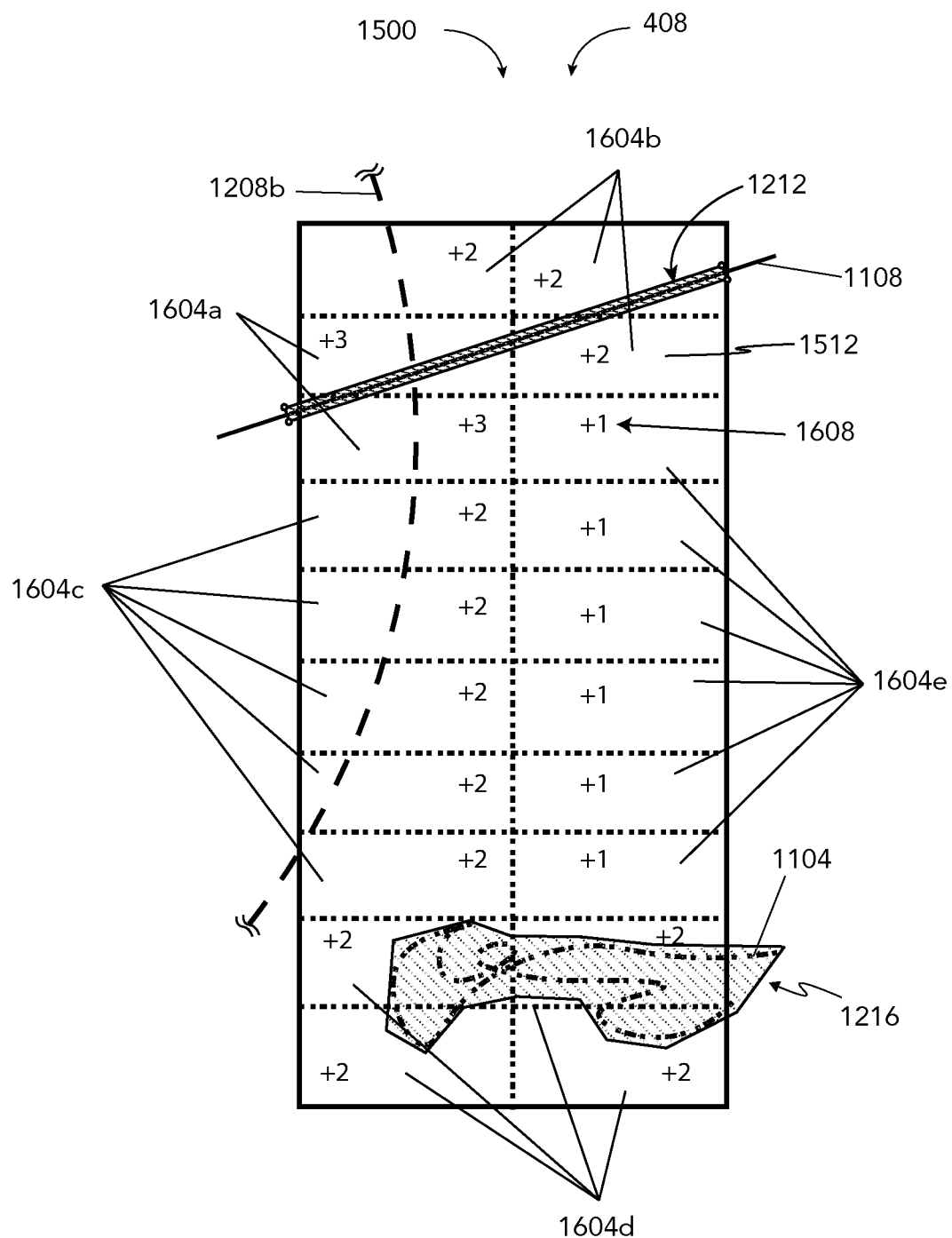
FIG. 16 shows a line drawing illustrating the exemplary agriculture area of FIG. 4 and including an exemplary food safety grid along with certain exemplary food safety risks and portion of an exemplary manner for calculating weighted strata, useful for certain embodiments in accordance with the present disclosure.

In one or more embodiments, for each marked food safety risk associated with the selected agriculture area, the system may determine into which food safety zone or zones the food safety risk is located (in a geolocated overlay manner) and/or impacts. An exemplary and non-limiting example is illustrated in FIG. 16. As shown in FIG. 16, food safety grid 1500, comprising contiguous, regular and equal rectangular zones, is associated and coextensive with section 408 of field 104. Also shown are food safety markers 1208b, 1212, and 1216, created and stored in the system from one or more audits of section 408, corresponding with proximity/static risk 1204a (dairy shed), static risk 1108 (overhead wire) and variable risk 1104 (deer tracks), respectively.

In general, in one or more embodiments of the system disclosed herein, the system may determine sampling plans based in part on audit information in any suitable manner sufficient to provide the functionality described herein. For example, in one or more non-limiting embodiments (e.g., system 200 embodiments), the system may utilize a weighted scoring method to generate weighted strata for use in a stratified random sampling plan. In the exemplary embodiment illustrated by FIG. 16, the system may allocate 1 scoring point to every zone initially, and thereafter allocates another point for any risk factor present in zone, with all risk factors weighted equally by default. In other words, in FIG. 16, the system allocates 1 point total to each zone having zero food safety risks physically present in the zone (i.e., zones 1604e), 2 total points to each zone that has one food safety risk physically present in the zone (i.e., zones 1604*b*, *c*, and *d*), and 3 total points to each zone that has two food safety risks physically present (i.e., zones 1604*a*).

Figure 17C:
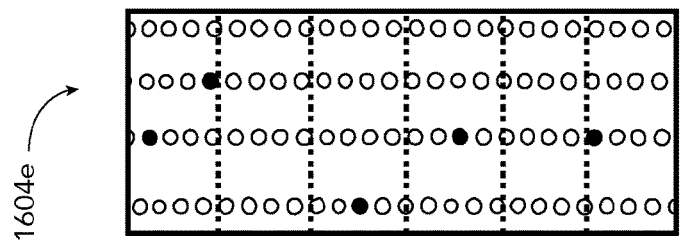
FIG. 17C shows a line drawing illustrating a weighted strata and sample plan information determined by embodiments of the present disclosure for the agriculture area of FIG. 4, useful for certain embodiments in accordance with the present disclosure.
Figure 17B:
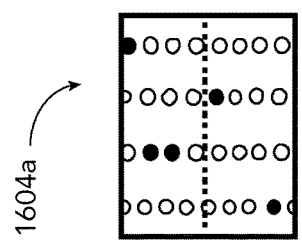
FIG. 17B shows a line drawing illustrating a weighted strata and sample plan information determined by embodiments of the present disclosure for the agriculture area of FIG. 4, useful for certain embodiments in accordance with the present disclosure.
Figure 17A:
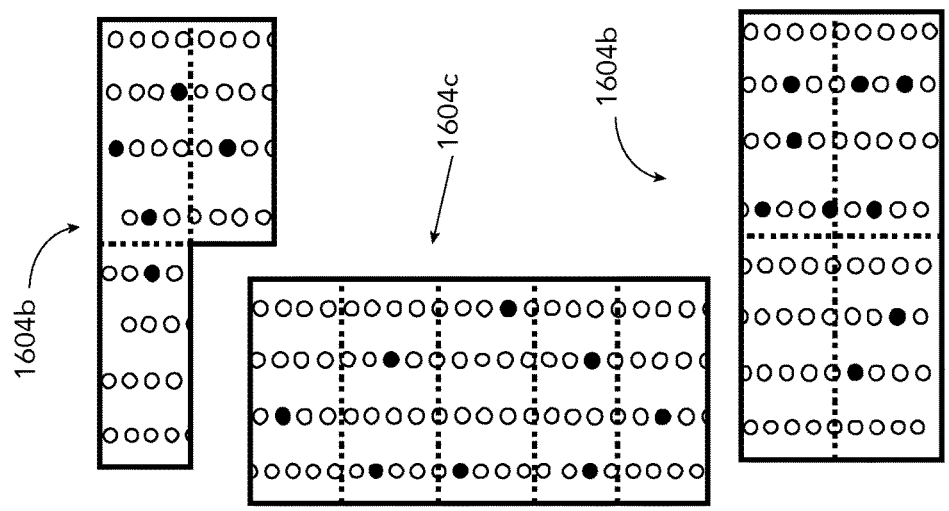
FIG. 17A shows a line drawing illustrating several weighted strata and sample plan information determined by embodiments of the present disclosure for the agriculture area of FIG. 4, useful for certain embodiments in accordance with the present disclosure.

Using the calculated weights, the system may determine a sampling plan for the agriculture area (section 408) in part by determining a sampling set, S, according to a weighted stratified random sampling method using weighted strata determined utilizing the weighted zone scoring as described in relation to FIG. 16. In particular, as shown in FIG. 17, in this example, three weighted strata may be generated: a first strata comprising zones having 1 point (e.g. zones 1604*e*), a second strata comprising zones having 2 points (e.g., zones 1604*b*, *c*, and *d*), and a third strata comprising zones having 3 points (e.g., zones 1604*a*). The system may then determine the number of sample collection locations for allocation to each weighted strata, NW, using the following formula:

$$NW = k*NS \qquad (2),$$

wherein k is the weighting factor for the strata and NS is the number of unweighted sample collection locations allocated to the strata. The weighting factor may be calculated using the following formulas:

$$k = PS/PT \qquad (3),$$

wherein PS is total number of weighted points in a strata and PT is the total number of weighted points for the agriculture area (i.e., for all zones). For embodiments in which the number of sampling grid locations per food safety zone is equal or nearly equal, the number of unweighted sample collection locations may be calculated using the following formula:

$$NS = ZS/ZT*NG \qquad (4),$$

wherein ZS is the number of zones in a strata, ZT is the total number of zones for the agriculture area, and NG is the total number of sample collection locations for the agriculture area.

FIG. 17 shows an exemplary weighted strata random sampling set, S, of sample collection locations, si,j (shown as filled ovals), for section 408 using the audit information and food safety grid, F, illustrated by FIG. 16, and formulas 2-4. As in the exemplary random sampling set for section 408 illustrated in FIG. 5B, the total number of sample collection locations for section 408 is 32, chosen simply for the sake of illustration.

Exemplary Device

Figure 18:
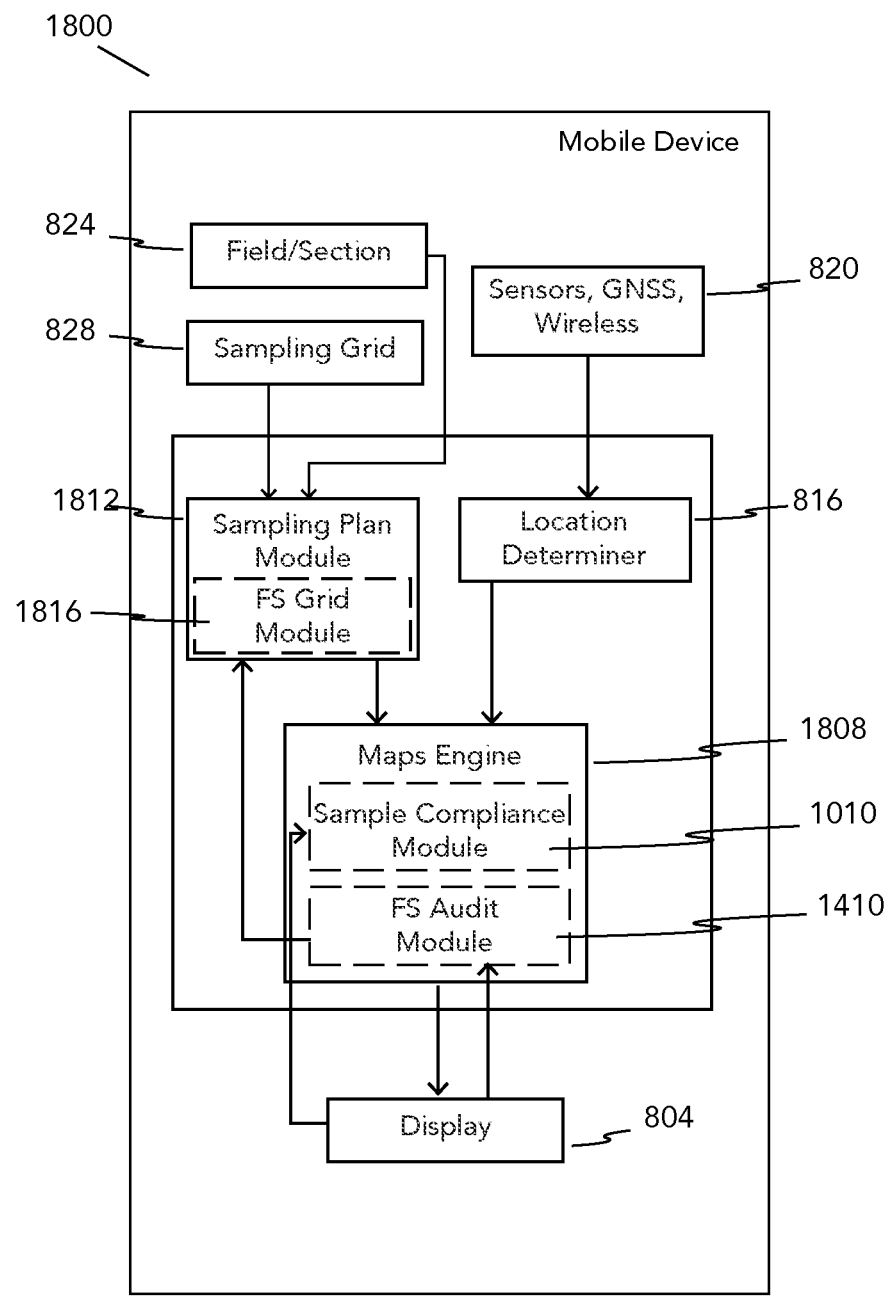
FIG. 18 shows a block diagram illustrating components of an exemplary mobile device according to some embodiments of the present disclosure.

FIG. 18 shows a block diagram illustrating certain components and subsystems (which themselves may contain one or more components) of exemplary mobile device 1800. Mobile device 1800 may include one or more processors and a computer-readable storage medium storing instructions executable by the one or more processors to perform operations described herein. Additional details about mobile device 1800 architecture and functionality are described above with reference to FIG. 3B and FIG. 8. Mobile device 1800 may include multiple subsystems and/or components, each of which may be implemented as computer instructions executable by the one or more processors.

Other than for the components and subsystems needed to provide the sample planning using food safety audit information functionality described in relation to FIGS. 15-17, description of the components and subsystems of device 1800 is provided above in relation to devices 600, 900, and 1200, in FIGS. 8, 10, and 14.

With reference to FIG. 18, in one or more embodiments maps engine 1808 may provide maps data for rendering on touchscreen display 804 (directly or indirectly via one or more UI components, subsystems or applications) all or portions of sample collection tracker screens (e.g., screens 901) and food safety audit screens (e.g., screen 1202), as well as any screens relating to food safety zone setting screens (not shown), according to one or more embodiments herein.

In one or more embodiments, maps engine 1808 receives sampling plan information from sampling plan module 1812. In general, sampling plan module 1812 may be configured to generate or obtain sampling plans for user-selected agriculture areas (e.g., fields and/or sections) and provide sampling plan information for rendering on display 804 in connection with map information for the field/section of relevance (e.g., the field and/or section selected by a user of device 1800). Further description of sampling plan module 1812 may be had by reference to sampling plan module 812 of device 600 in FIG. 8. Additionally, sampling plan module 1812 may comprise a food safety grid module 1816. In general, food safety grid module may be configured to generate or obtain food safety grid, F, for the agriculture area of relevance, and to implement one or more weighted sampling plan strata models for random sampling that utilize food safety audit information received from food safety audit module 1410, as described above in relation to FIGS. 15-17.

Figure 19:
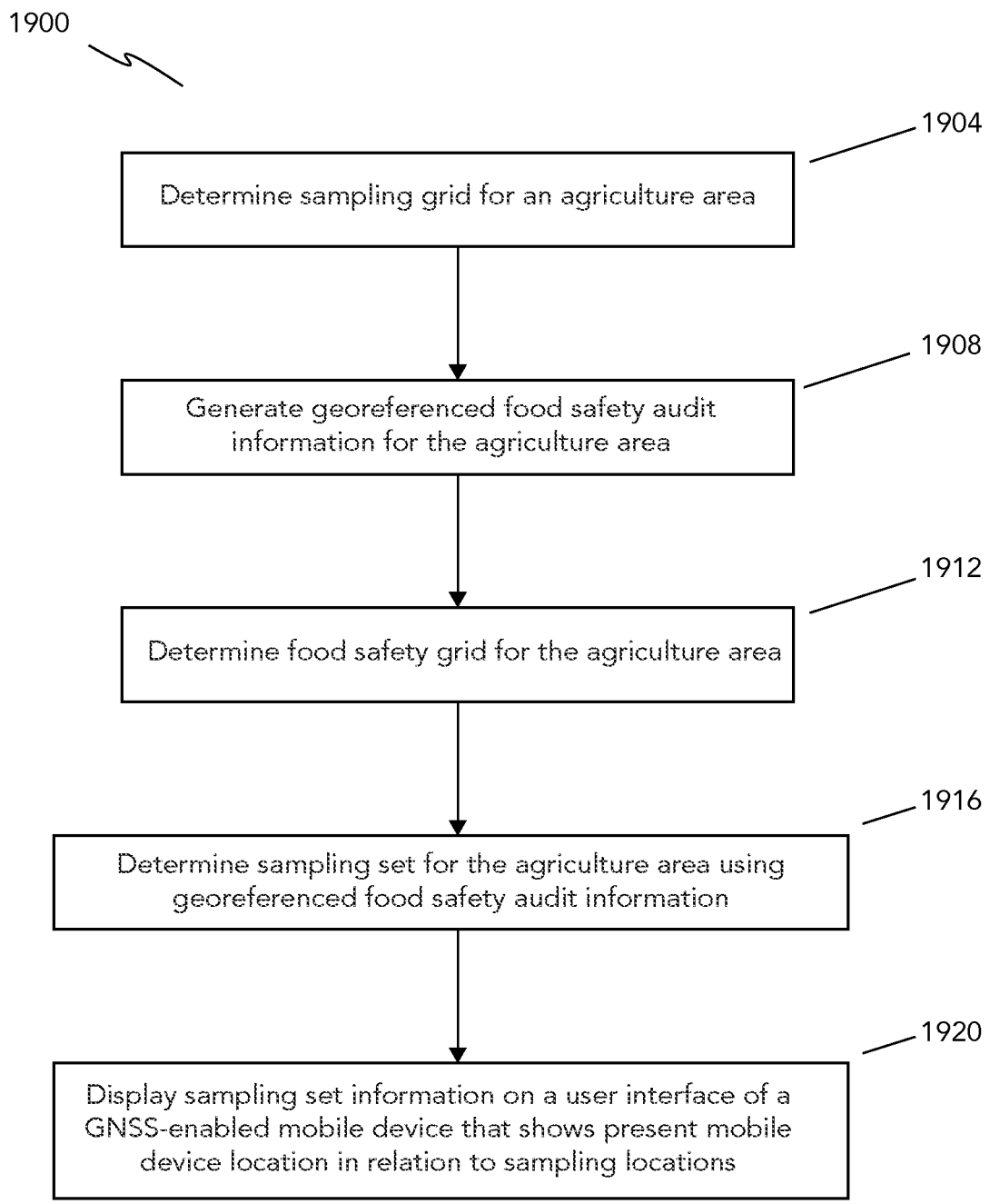
FIG. 19 shows a flow diagram of a method for performing sampling of an agriculture area based in part on food safety audit information of the agriculture area using the system of the present disclosure, according to some embodiments of the present disclosure.

FIG. 19 is a flowchart illustrating a method 1900 for performing sampling of an agriculture area, according to one or more embodiments of the present disclosure. In this example, one or more components of the system (e.g., system 200 embodiments), such as a mobile device (e.g., device 224 embodiments) and/or an application server (e.g., server 216 embodiments) may execute modules of a food safety application to carry out method 1900.

At step 1904, system 200 may determine a sampling grid for an agriculture area, such as section 408, as described above in relation to FIGS. 6 and 7.

At step 1908, a user may generate georeferenced food safety audit information for the agriculture area using the system, as described above in relation to FIGS. 11-14.

At step 1912, system 200 may determine a food safety grid for the agriculture area, as described above in relation to FIG. 15.

At step 1916, system 200 may determine a sampling set for the agriculture area using the georeferenced food safety audit information, as described above in relation to FIGS. 16-18.

At step 1920, system 200 may display sampling set information (e.g., sampling locations of the sampling set) on a user interface of a mobile device of the system (e.g., device 224 embodiments) that shows the current location of the mobile device in relation to the sampling locations, as described above in relation to FIGS. 6 and 9.

It should be understood that an aspect, element, feature, structure, function or characteristic that is described in relation to an embodiment is not necessarily limited to the embodiment described, but rather may be applicable to one or more embodiments, unless expressly stated otherwise. Similarly, the phrases "in an embodiment," "in some embodiments," or similar phrases, appearing in the present disclosure are not necessarily all referring to the same embodiment or the same set of embodiments. Also, the description set forth herein is not to be construed as limited to the embodiments shown; rather, it is appreciated that various modifications may occur to those skilled in the art that, while not specifically set forth herein, are nevertheless within the spirit and scope of the description. When an embodiment is described as "exemplary", "particularly," or the like, herein, it is to be understood as one non-limiting example embodiment, and does not preclude other embodiments that may not include the limitations described in the exemplary embodiment. Further, unless expressly stated otherwise, "or" refers to an inclusive or and not to an exclusive or. Any implementation described herein as exemplary is not necessarily to be construed as preferred or advantageous over other implementations. There is no intention to be bound by any expressed or implied theory presented in the preceding technical field, background, or detailed description.

Certain terminology used in the this description is for the purpose of reference only, and thus is not intended to be limiting. For example, terms such as "upper", "lower", "above", and "below" refer to directions in the drawings to which reference is made. Terms such as "front", "back", "rear", "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms do not imply a sequence or order unless clearly indicated by the context.

Conventional techniques related to processing, data transmission, signaling, network control, and other functional aspects of the systems and/or components may not be described in detail herein for the sake of brevity. Further, connecting lines in various figures contained herein are intended to represent exemplary functional relationships and/or physical couplings between the various elements, but it should be noted that many alternative or additional functional relationships or physical connections may be present in an embodiment of the subject matter.

As may be appreciated by one of skill in the art, aspects of the embodiments described herein may be employed as a system, method or computer program product. Accordingly, aspects may take the form of a hardware embodiment, a software embodiment (including firmware, etc.) or an embodiment combining hardware and software.

Aspects of the present embodiments described herein may take the form of a computer program product embodied in one or more computer readable medium(s) having computer readable program code represented thereon. Further, the systems and methods described herein may be applied as standalone systems or methods, or as part of an integrated package, such as a farm or field management package or application.

As also may be appreciated by one of skill in the art, aspects of the embodiments described herein as functions, routines, algorithms or methods may be implemented in software, which software may comprise computer executable code/instructions stored on computer readable media. Multiple functions may be performed in one or more modules as desired, and the embodiments described are merely examples. The software may be executed on one or more DSP, CPU, GPU, ASIC, FPGA, SoC, microprocessors, or other type of processors operating on one or more computer systems or processor environments, such as a personal computer, server, PaaS, or other computing system.

When dealing with software embodiments, the embodiments are not dependent on any particular software language or type of language, unless context suggests otherwise, and in general any suitable programming language may be employed. When dealing with APIs, libraries, components, modules, or similar software concepts and constructs, code may be described abstractly using functional language or using pseudocode or other high level description. Unless context suggests otherwise, the terms "module" and "component" may be used interchangeably herein. Generally, modules and components may be considered to be portions of related code that perform one or more related routines (functions/methods) and are portions of a larger whole, and whose scope may vary. In some circumstances, they may comprise one or more class libraries of an application that provide one or many routines (functions/methods), while in others they may refer to a single application of an application suite.

The various tasks performed in connection with the process may be performed by software, hardware, firmware, or any combination thereof. For illustrative purposes, the description of the process may refer to elements mentioned above. In practice, portions of the process may be performed by different elements of the described system, e.g., component A, component B, or component C. It should be appreciated that process may include any number of additional or alternative tasks, the tasks shown need not be performed in the illustrated order, and the process may be incorporated into a more comprehensive procedure or process having additional functionality not described in detail herein. Moreover, one or more of the tasks could be omitted from an embodiment of the process as long as the intended overall functionality remains intact.

Although at least one exemplary embodiment has been presented in the foregoing detailed description, it should be appreciated that any number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A computer implemented method for sampling an agriculture area comprising:
   at a mobile device comprising one or more processors, memory, a display, and a geolocation subsystem;
   displaying, on the display of the mobile device, map information of an agriculture area overlaid with a plurality of sampling plan visual elements and a geolocator visual element; and
   determining, using the geolocation subsystem, the current location of the mobile device,
   wherein each sampling plan visual element provides an indication of the geographic location of a sampling location according to a sampling plan for the agriculture area,
   wherein the geolocator visual element provides an indication of the current location of the mobile device, and
   wherein the sampling plan is based in part on food safety audit information.

2. The method of claim 1, wherein the sampling plan consists essentially of a set of sampling locations.

3. The method of claim 1, further comprising, changing the visual appearance of any of the plurality of sampling plan visual elements if the current location of the mobile device is within a predetermined area centered on the geographic location of the sampling location indicated by the sampling plan visual element.

4. The method of claim 1, further comprising, changing the visual appearance of any of the plurality of sampling plan visual elements if the current location of the mobile device is within a predetermined distance from the geographic location of the sampling location indicated by the sampling plan visual element.

5. The method of claim 1, wherein the geolocation subsystem comprises one or more GNSS receivers.

6. The method of claim 1, further comprising displaying, on the display of the mobile device, a compliance interface element that is configured to accept a user interaction only when one or more preconfigured sample collection compliance criteria have been satisfied, wherein the user interaction causes the mobile device to store a log entry recording information indicative of the user interaction.

7. The method of claim 6, wherein the log entry is stored in memory of the mobile device.

8. The method of claim 6, wherein the compliance interface element is a button and wherein preconfigured sample collection compliance criteria includes a proximity requirement comprising the current location of the mobile device being within a predetermined distance from the geographic location of a sampling location.

9. The method of claim 8, wherein the preconfigured sample collection compliance criteria further includes a dwell time requirement comprising the current location of the mobile device being within the predetermined distance for at least a predetermined amount of time.

10. The method of claim 9, wherein the log entry information comprises a timestamp of the user interaction and location information sufficient to geolocate the sampling location.

11. The method of claim 1, wherein the sampling plan comprises a list of sampling locations determined using a random sampling model, a stratified random sampling model, or a geometric-pattern sampling model.

12. The method of claim 1, wherein the sampling plan comprises a list of sampling locations determined using a weighted strata random sampling model in which the strata are weighted based in part on food safety audit information.

13. A computer implemented method for performing a food safety audit of an agriculture area comprising:
   at a mobile device comprising one or more processors, memory, a display, and a geolocation subsystem;
   displaying, on the display of the mobile device, a user interface (UI) comprising a map of an agriculture area and at least one food safety control element, wherein the at least one food safety control element is configured to provide a plurality of food safety map marker elements for selection by a user; and
   marking, by a user, at least one food safety risk existing in relation to the agriculture area using a food safety marker element,
   wherein the step of marking comprises selecting on the UI an appropriate food safety marker element from the plurality of food safety map marker elements and geolocating the food safety marker element on the map to be proximate the at least one food safety risk.

14. The method of claim 13, wherein the at least one food safety risk is selected from the group consisting essentially of static-type food safety risks and variable-type food safety risks.

15. The method of claim 14, wherein the plurality of food safety map marker elements is selected from the group consisting essentially of text, pins, circles, rectangles, polygons, lines, segmented lines, and curved lines.

* * * * *